United States Patent [19]

Geesen et al.

[11] 4,398,286

[45] Aug. 9, 1983

[54] RADIO METHOD AND APPARATUS FOR GATHERING AND PROCESSING INFORMATION COMING FROM A PLURALITY OF STATIONS

[75] Inventors: Michel Geesen, Antony; Jacques Mourant, Maurepas; Daniel P. Ludwig, Ranonville, all of France

[73] Assignee: Electronique Marcel Dassault & Centre National d'Etudes Spatiales, Paris, France

[21] Appl. No.: 166,621

[22] Filed: Jul. 7, 1980

Related U.S. Application Data

[63] Continuation-in-part of Ser. No. 38,770, May 14, 1979, abandoned.

[30] Foreign Application Priority Data

May 12, 1978 [FR] France .............................. 78 14339

[51] Int. Cl.³ .......................... H04J 1/05; H04J 1/16; H04B 1/06; H04B 17/00
[52] U.S. Cl. ................................... 370/69.1; 370/75; 455/17; 455/226; 455/265
[58] Field of Search ................. 455/12, 32, 34, 67, 455/71, 133, 140, 9, 17, 226, 260, 265; 370/50, 57, 69, 73, 93, 104, 69.1, 75

[56] References Cited

U.S. PATENT DOCUMENTS

| | | | |
|---|---|---|---|
| 2,926,304 | 2/1960 | Fromm | 455/121 |
| 3,283,249 | 11/1966 | Mitchell | 455/17 |
| 3,810,255 | 5/1974 | Wachs | 343/100 ST |
| 3,864,521 | 2/1975 | De Long et al. | 370/57 |
| 4,002,980 | 1/1977 | Herz | 343/101 |

Primary Examiner—Marc E. Bookbinder
Attorney, Agent, or Firm—Pollock, Vande Sande & Priddy

[57] ABSTRACT

In a satellite which asynchronously receives radio frequency signals from a plurality of beacons scattered at the surface of the earth, each signal received has a pure carrier wave portion followed by a phase modulated message carrying portion. The frequencies of the signals are not known within a predetermined frequency band. The satellite has a plurality of essentially identical processing units which each receive on their input all the signals present at any given instant in the input frequency band. Each processing unit has a phase locked loop which may be progressively tuned to the frequency of one of these input signals in response to a frequency estimate of this signal to which the operating frequency of the phase locked loop is preset. This frequency estimate is updated until the phase lock occurs on this input signal, ready for demodulation of the message part to begin. The estimate frequencies are derived from an input band frequency spectrum analyzer. A command unit selectively allocates each new frequency estimate to a respective processing unit as a result of a comparison therof with the previously allocated frequency estimates to accelerate the tuning of the processing units and prevent any duplication of the processing of a same input signal.

30 Claims, 12 Drawing Figures

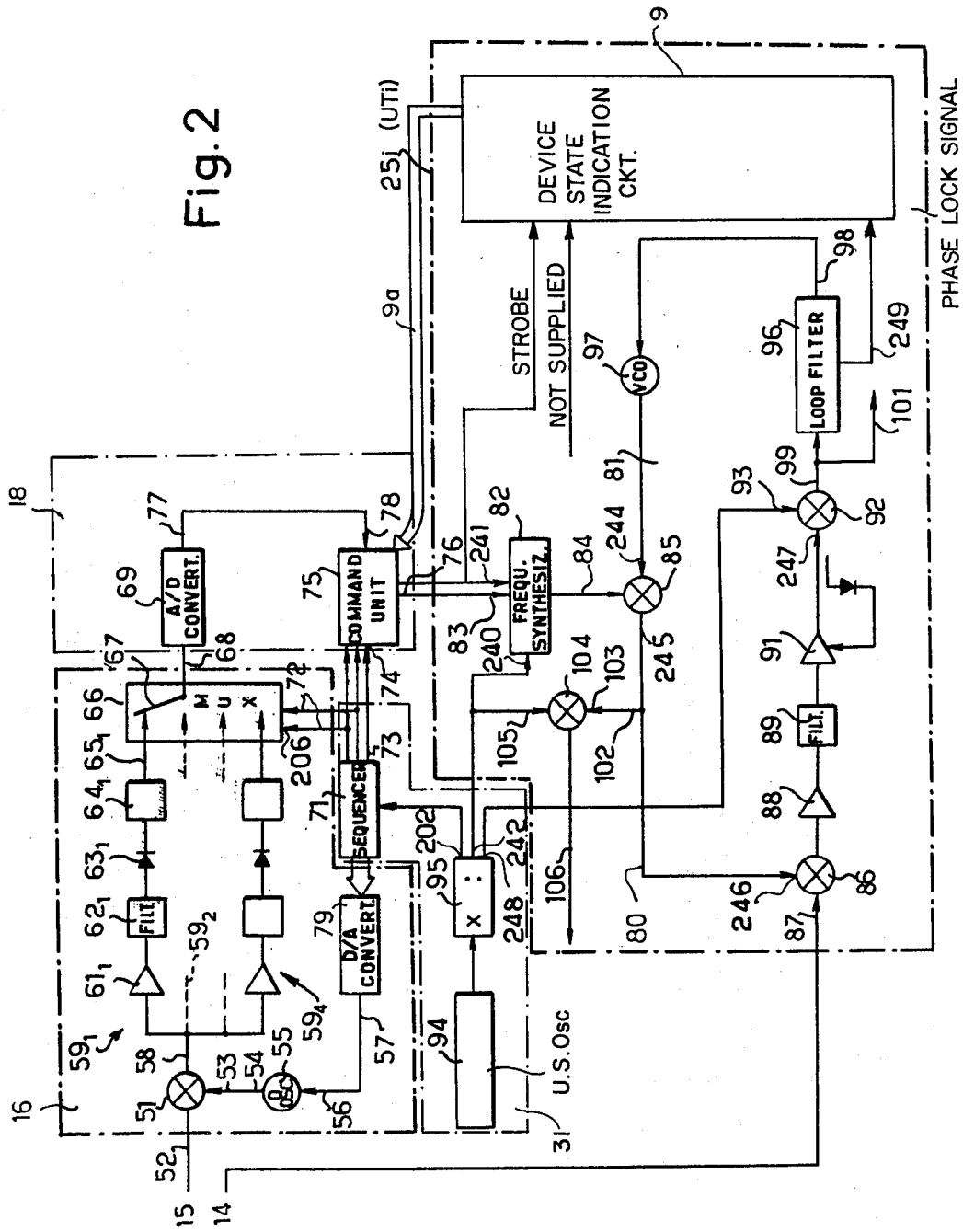

RADIO METHOD AND APPARATUS FOR GATHERING AND PROCESSING INFORMATION COMING FROM A PLURALITY OF STATIONS

This application is a continuation-in-part of U.S. patent application Ser. No. 038,770 filed May 14, 1979 and now abandoned.

The invention relates to a radio method and apparatus for gathering and processing information received from a plurality of stations.

BACKGROUND OF THE INVENTION

It is known that a convenient means for quickly gathering information relative to an extensive area of the terrestrial globe consists in providing on a satellite moving relative to the earth a receiver apparatus adapted to receive radio information coming from a plurality of beacons distributed over the zone overflown by the satellite.

An object of the invention is to provide a method for gathering and processing large amounts of radio information while calling upon a simple apparatus for equipping both the beacons and the satellite.

The beacon transmitters which may have identical or very close nominal frequencies from which the real frequencies deviate by reason of the different ageing of the transmitters or variations of climatic conditions, transmit messages at regular or irregular time intervals, the messages customarily being of unequal durations.

In any event the messages transmitted by the beacons reach the satellite at unanticipated moments, or asynchroneously, and an object of the invention is to take best advantage of the equipment of the satellite in order that the gathering of data contained in the messages is effected at maximum speed and efficiency while preserving equipment of great simplicity.

According to an object of the invention, the equipment of a satellite comprises a plurality of radio processing devices each of which is adapted to extract the information from a received message and it is characterized by the fact that the equipment comprises a management unit which adapts the processing devices to the determined frequency of a message in the course of reception and directs said message to that one of the processing devices which is best able to effect the processing.

It provides a receiving and management unit which determines for each message received its frequency value and its level value, which gives preference to messages at high level over those at lower levels, which directs a message of a frequency value to a processing device previously adapted to said value and which after the beginning of processing by said device, inhibits the routing of other messages to said device.

The invention is of particular interest in case the information translated by phase modulation of a carrier wave and it provides carrying out at the receiving and management apparatus, upstream of the processing devices, a sufficiently accurate estimate of the frequency to direct a message to a processing device having a phase locked loop (PLL) which is operational with respect to the frequency of said message and it then provides allocating said message definitively to said processing device only after the phase locked loop of the device is set at the carrier frequency with the accuracy required for handling the characteristic phase modulation of said message.

According to the invention, also, there is provided before definitive allocation to a processing device, routing to said device any signal whose frequency is in the operational band of its phase locked loop and whose level is greater than that of a signal already assigned said device.

By this "conditioned freedom" of the link between the receiving-management apparatus and the processing device, the processing device is automatically brought into precise frequency accord required for the demodulation, and simultaneously, optimum efficiency is conferred on the equipment while assuring the reading of the messages which are the best received and thus do not risk being disturbed, the occupation of said device thus having a surely useful result.

Satellite equipment according to the invention not only permits the gathering of information from the different messages received but also the locating of the beacons transmitting said messages, while taking advantage of the Doppler effect, which affects all messages received and without which it would be necessary to provide particular arrangements for this purpose.

BRIEF DESCRIPTION OF THE DRAWINGS

In the description which follows, given by way of example, reference is made to the accompanying drawings, in which:

FIG. 2 is a more detailed schematic diagram of a part of said equipment;

The satellite moves above a territory, land and/or sea, in which are distributed a certain number of beacons some of which may be fixed and other mobile, placed on land or water, or even carried by balloons or other airborne devices. Each of the beacons transmits messages at regular or irregular time intervals. Each message comprises, for example, a first part which is a pure carrier wave and a second part which is modulated, advantageously phase modulated, the modulation translating the information to be transmitted into digital language. The frequencies of the beacons are contained within a frequency band which may be in the order of several kHz.

For example, originally the transmitters of the beacons have the same nominal frequency and their real frequencies become different by reason of the different ageing of the transmitters and the climatic conditions to which they are subjected.

Or, if the beacons are extremely numerous their frequencies may be contained within a larger band of the order of several tens of kHz.

The first part of each message constituted by a pure carrier wave has a duration of the order of 100 to 200 milliseconds. The message per se has a duration of the order of 200 to 1000 milliseconds. It advantageously comprises a start of a message which is the identification number of the beacon which transmits the message.

These numerical indications are given only by way of illustration.

The messages reach the satellite in a random manner, that is to say, without it being possible for the satellite to anticipate the moment a message will be received. In fact at a given instant messages emanating from numerous beacons may be received simultaneously or virtually simultaneously with intensities which may vary from one message to another depending on transmission factors.

The fact that the messages are transmitted at very close frequencies causes interference, namely for the low level signals which may greatly interfere with the high level signals.

Moreover, each signal is at least for its part assigned to the message, not at a single frequency but surrounded by frequency lines.

Furthermore, the satellite is constantly in the course of displacement relative to the beacons.

Figure 1:
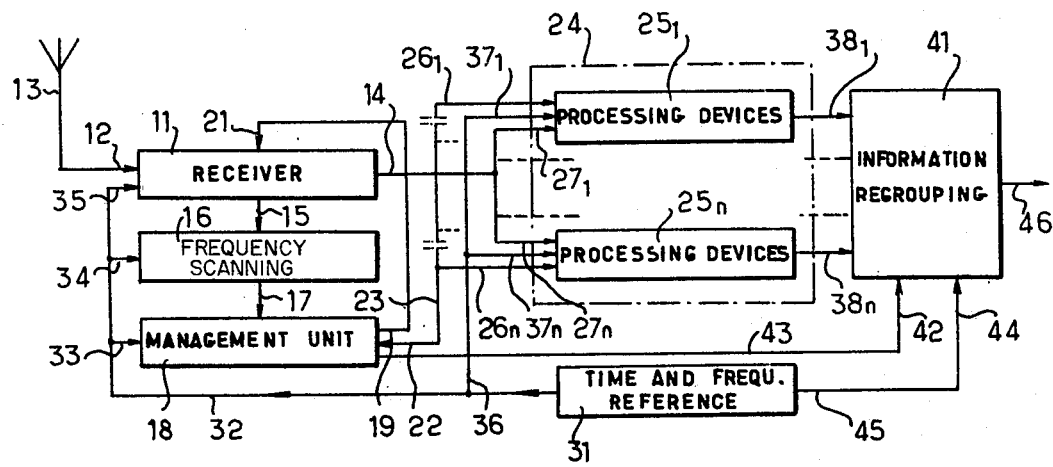
FIG. 1 is a schematic diagram of satellite equipment.

As first briefly described with reference to FIG. 1, the equipment of the satellite comprises a receiver 11 to the input 12 of which are applied signals picked up by an antenna 13. The receiver 11 translates signals into frequency and the translated signals are present at the output 14. The receiver 11 is chosen and arranged in order not to modify the relationship of the levels of the different signals simultaneously present and to transmit the signals received without creating supplementary signals even when a plurality of signals are present simultaneously.

Another output 15 of the receiver 11 is applied to an apparatus 16 adapted to carry out the frequency scanning of the input signal frequency range, as explained in more detail with reference to FIG. 2 and following.

The output of apparatus 16 is applied via a link 17 to a management unit 18. At the output 19 of the management unit 18 is present a signal which, applied to an input 21 of the receiver 11, commands the latter so that it has a constant gain whatever the level of the signals applied to its input 12 may be. An output 22 of the management unit 18 is part of a two-way link 23 between the management unit 18 and a processing unit 24 comprising a plurality of processing devices $25_1$, $25_2$, $25i$, $25_n$, in principle identical with one another, and connected to the link 23 by conductors, respectively $26_1$, $26_2$, etc . . . $26_n$.

Said lines 26 thus apply to the processing devices 25, corresponding to a signal received by the receiver 11, a factor representative of the frequency of said signal and a factor representative of level, as furnished by the apparatus 16.

The apparatus 16 comprises means for carrying out a frequency scanning in a frequency range considered. This range has a width which depends on the frequency variation which may be caused by Doppler effect and also the number of beacons which it must process. For example, the frequency band being 24 kHz, scanning is effected between a lower limit and an upper limit in 80 ms.

The lines 26 provide the devices 25 with other signals as will be seen hereinafter, and they also serve to inform the management unit 18 as to the state of said devices.

The output 14 of the receiver 11 is divided into branches $27_1$, $27_2$ . . . $27_n$, applying after frequency transposition to devices $25_1$ . . . $25_n$ the signals received by the antenna 13.

A time and frequency reference divider 31 is connected to the input 33 of the management unit 18, to an input 34 of the frequency scanning apparatus 16, to an input 35 of the gain-controlled receiver 11.

The time and frequency reference device 31 is also connected by line 36, divided into branches $37_1$ . . . $37_n$, to processing devices $25_1$ . . . $25_n$.

The outputs $38_1$ . . . $38_n$ of the various devices $25_1$ . . . $25_n$ are applied to the inputs of an apparatus 41 for regrouping information of which another input 42 is connected to the management unit 18 by a line 43 and yet another input 44 is connected to the time and frequency reference device 31 by line 45.

The output 46 of the regrouping apparatus 41 is connected to the memory of the satellite or even to the information transmission apparatus adapted to transmit gathered information to the ground after it has been processed.

In an embodiment the frequency scanning apparatus 16 comprises a mixer 51 (FIG. 2) the input 52 of which is connected to the output 15 of the receiver 11 and the other input 53 of which is connected to the output 54 of a quartz oscillator 55 whose frequency is controlled by the electric potential applied to its input 56 via a line 57 which is connected at the output of a digital/analog converter 79 connected to the output of a sequencer 71. This sequencer is part of a timing and frequency reference circuit such as 31 of FIG. 1.

In the case chosen by way of example, the band within which the frequency of the quartz frequency 55 may vary is one-fourth the size of the frequency band the signals applied to the input 52. The output 58 of the mixer 51 is divided into four paths or channels $59_1$ . . . $59_4$. Each path 59 comprises an amplifier 61, a band pass filter 62 the center frequency of which is at the center of a respective portion of the input frequency band.

Each channel 59 further comprises envelope detector 63 followed by a filter 64 the output of which is applied to an input 65 of a multiplexer 66, or switch, the different paths thus being succesively and periodically connected to input 68 of an analog to digital converter 69. At the output 77 of the latter are therefore present in succession, if they exist, signals included in a first elementary frequency band portion corresponding to the path $59_1$, in a second elementary band portion corresponding to the path $59_2$, etc . . . The level of signals at the outputs of filters 62 . . . $62_4$ depends upon the position of the frequency of the respective channel input signal with respect to the center frequency of such filter.

The multiplexer 66 is under the control of the sequencer 71 to which it is connected by a line 72. The sequencer 71 is also connected by line 73 to a first input 74 of a command unit 75 which is an essential part of the management unit 18, a second input 78 of which is connected to the output 77 of the analog digital converter 69. The sequencer 71 is a counter having a count input 201 (FIG. 5) connected to an output 202 of a multiplier 95 (FIG. 2) which is supplied with clock pulses by an ultrastable oscillator 94 all part of time reference circuit 31 of FIG. 1.

The sequencer 71 counts a 6 kHz clock signal on its input 201 (FIG. 5) and outputs a digital count indication on its parallel outputs 203 which is passed to the input of digital to analog converter 79 for producing a cyclically variable sweep voltage at the output thereof.

The sequencer 71 also has two of its stages (outputs 205) connected to the controlling input 206 of multiplexer 66 by two control lines 72. The multiplexer is arranged to decode the indications carried by the lines 72 in order to switch the input of converter 69 from one channel 59 to the next at a regular rate in response to signals appearing on the outputs 205 of the sequencer. The same outputs 205 are connected in the command unit 75 (FIG. 5) to a channel decoder 210.

The sequencer also has an output 211 which is connected via line 74 to a sweep recopy register 215 in the command unit 75. The count in the sweep recopy register 215 follows that controlling the sweep frequency generator 55 so that the indication contained in the register 215 corresponds at any time to the frequency position of the difference signal analysed in each of channels $59_1$–$59_4$ within the respective channel frequency range.

In operation, each frequency channel $59_1$ to $59_4$ receives an input signal from the mixer 51 whose frequency corresponds to the difference between the oscillator frequency at a corresponding point in its sweep cycle and the frequency of any input signal on the input 52 of the mixer 51. Thus, as the output frequency of the oscillator 55 varies, the input signal frequency on analysis channels $59_1$ to $59_4$ may vary correspondingly in a respective frequency band centered on the center frequency of respective filter $62_1 \ldots 62_4$.

As soon as a signal from receiver 11 is present on input 52 whose frequency is such that the corresponding difference frequency at the output of the mixer 51 will vary within the frequency range of channel $59_1$, a respective signal will appear at the output of the band pass filter 62. As the difference frequency nears the center frequency of this filter 62, the level which is admitted to appear at the output of said filter increases. Such a signal level is detected by the envelope detector $63_1$ and the respective output signal is passed to low pass filter $64_1$ so that an analog DC signal is present at the output $65_1$ of channel $59_1$ which is converted into a digital indication of the level as soon as the multiplexer 66 connects output $65_1$ to output 68 of the converter 69.

The multiplexer 66 connects sequentially the channels 59 to this A/D converter 69, so that the level of the output of such channels is sequentially sampled by the A/D converter 69 for digital conversion of the corresponding level.

The digital level values at the output of the A/D converter 69 corresponding to successive analog level values at the output of channel $59_1$ increases with the sweep frequency value to reach a maximum when the respective difference frequency at the output of mixer 51 becomes closest to the center frequency of filter $62_1$ and then starts decreasing as the sweep frequency out of crystal oscillator 55 continues to increase. The sweep frequency value for this maximum digital level value provides a characteristic indication of the frequency of the signal out of receiver 11 which corresponds to the difference signal thus analysed. This indication may thus be used to derive an estimate value of this frequency for a demodulating processing device 25 in a manner which will be described later.

The same analysis is performed by each channel $59_1$ to $59_4$ and the corresponding level indications at the output of the A/D converter 69 will depend upon the signal frequencies present at the input 52 of the mixer 51 and the respective signal amplitudes.

The analog values at the output of each channel $59_1$ to $59_4$ are converted into digital values and passed to the command unit (input 78) at a rate which is equal to the multiplexing rate of multiplexer 66.

The conversion rate of the A/D converter is sufficiently high so that the output of each channel is sampled a number of times during one frequency sweep cycle of the quartz oscillator 55. Each time a digital level indication $N_s$ is present at the output 77 of A/D converter 69 (which is passed to the input 78 of the command unit 75), such command unit 75 derives from the channel decoder 210 and the recopy register 215 an indication of the frequency $F_s$ which corresponds to this level $N_s$.

Figure 5:
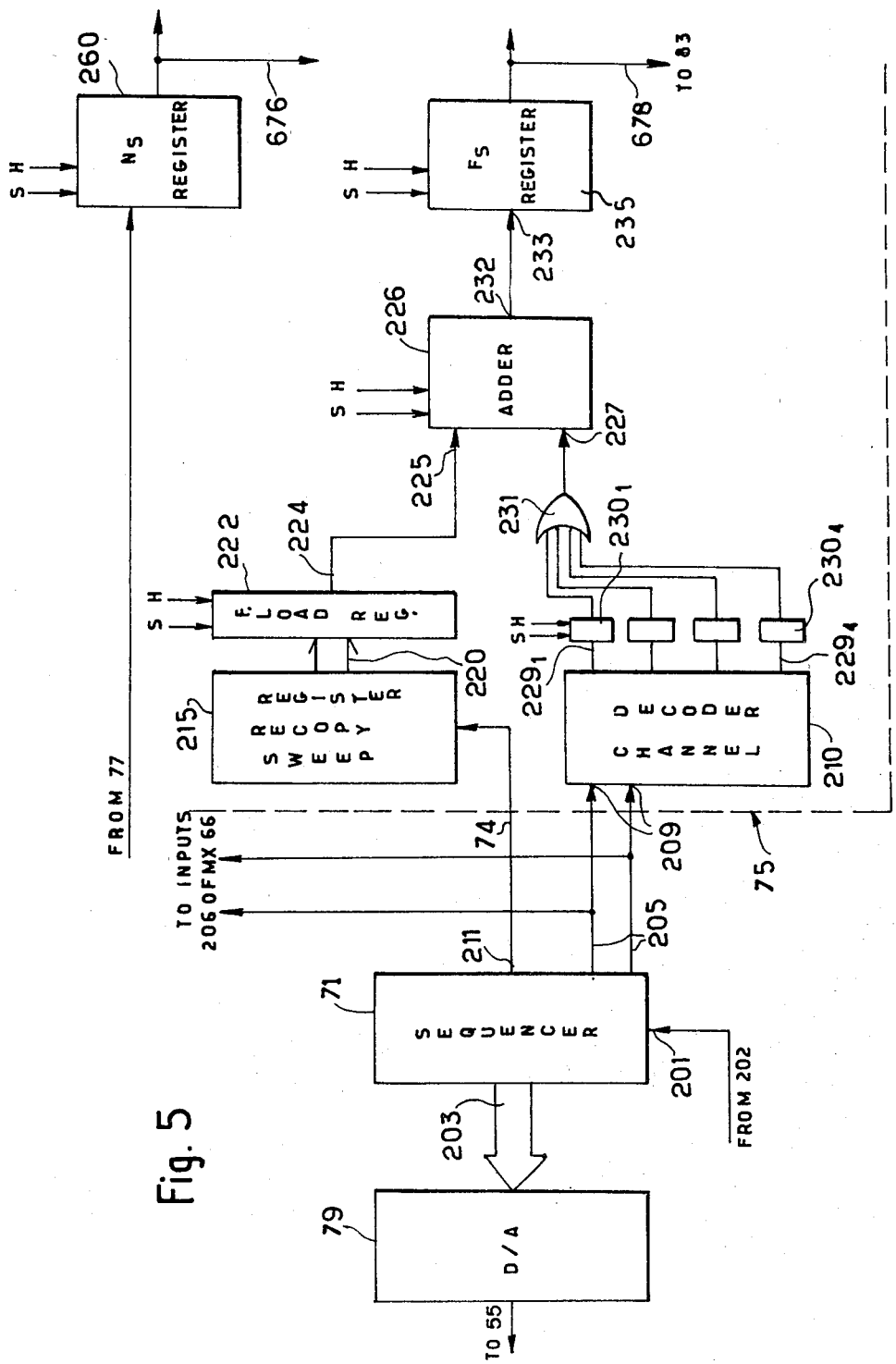
FIG. 5 is schematic diagram of the sequencer of FIG. 2 and its connections to the command unit.

FIG. 5 depicts very schematically how such frequency indication $F_s$ is derived. The sweep recopy register 215 has a serial input for receiving clock pulses from sequencer 71 to keep track of the instantaneous frequency supplied by oscillator 55 which corresponds to $N_s$ and has a parallel output 220 connected to a frequency load register 222 having a serial output 224, connected to one input 225 of a serial adder 226.

Channel decoder 210 has four outputs $229_1$ to $229_4$ each corresponding to a respective one of channels $59_1$ to $59_4$ and connected to a corresponding register $230_1$ to $230_4$, the outputs of these registers being connected to other input 227 of adder 226 through an OR Gate 231. The adder 226 has a serial output 232 which is connected to an input 233 of a frequency register $F_s$ 235.

Each of the registers $230_1$ to $230_4$, the frequency loading register 222, the adder 226, and the register 235 is responsive to two control signals, a strobe input S and a clock input H designed to operate such circuitry in the serial mode. When a strobe signal S is present, clock pulses H are operative to transfer bit by bit the contents of registers 222 and 230 to the serial adder 226 which in turn issues a series of bits to provide register 235 with a digital indication which corresponds to the frequency $F_s$ of the signal whose level $N_s$ is entered in a $N_s$ register 260 of the command unit 75.

Each output 229 of the channel decoder 210 is energized in response to a corresponding combination of bits on the inputs 209 of this decoder. In response to such energization the respective register 230 sends a serial bit indication corresponding to the lower limit of the frequency band to which the respective channel $59_1$ to $59_4$ is affected. This indication is added to the bit indication of the sweep frequency from variable oscillator 55 corresponding to the level indication $N_s$ to obtain the frequency value $F_s$ corresponding to such digital level value $N_s$.

Each couple of values $F_s$ and $N_s$ just acquired in accordance with the principles explained is subjected to an allocation procedure the object of which is to decide whether such values and in particular the frequency $F_s$ should be allocated to one of the processing devices 25 (see FIG. 1) and in the affirmative to which one. If it is determined that such a couple of values $F_s$, $N_s$ must be retained and allocated to one of the processing devices $25_1$ to $25_n$, the respective frequency value $F_s$ will be applied to the programming input of a frequency synthetiser in the respective processing device 25 and a phase locked loop, which will be described in greater detail later, starts to operate on the basis of the frequency estimate thus provided by $F_s$ to attempt to lock itself on an input signal appearing at the output 14 of a receiver 11. The value of level $N_s$ will at the same time be passed to this processing device for possible further transmission to earth later on.

Before the structure and operation of the command unit 75 which performs this allocation procedure is considered in detail, a brief description of a typical processing device 25 will be made with reference to FIG. 2.

As indicated before, each processing device $25_i$, also referred to as $UT_i$, comprises a phase locked loop 81 which is positioned on an estimate frequency by means of a frequency synthetiser 82 which receives on its programming input 83 a digital frequency estimate from the output 76 of the command unit 75 (output of $F_s$ register 235, FIG. 5). The frequency synthetiser 82 has a clock input 240 which is connected to an output 243 of multiplier 95 which is connected at the output of ultrastable oscillator 94. Synthetiser 82 also has an input 241 for receiving a strobe signal from command-unit 75 to authorize the loading of a new $F_s$ value output 76 of the command unit to the programming register of the synthesizer.

The details of frequency synthesizer 32 are known to those skilled in the art, and the synthesizer is comprised of a voltage controlled oscillator connected in a phase locked loop and having its output frequency divided by a programmable digital divider, the resulting signal being phase compared with a reference clock signal, as essentially shown in prior art U.S. Pat. No. 3,961,261. Each synthesizer in processing device $25_1$ to $25_N$ has its programming input connected to the frequency estimate output of a command unit 75 and is adapted to receive a strobe signal on a respective line 241 so that the frequency estimate is effectively transferred to the programming register of a selected one of such synthesizers when the respective strobe line 241 is energized.

The output of frequency synthetiser 82 is connected to one input 84 of a mixer 85 receiving on its second input 244 the output frequency signal of a voltage controlled oscillator 97 having a very high stability. The output 245 of mixer 85 is coupled to one input 246 of a mixer 86 whose other output 87 is directly connected to the output 14 of the receiver 11, as indicated with reference to FIG. 1. The output of the mixer 86 is connected via an amplifier 88 to a narrow band pass filter 89, having for example a central frequency of 15 mHz, and whose output is coupled through an amplifier 81 to the input 247 of a further mixer 92, mounted as a phase comparator and having a second input 93 connected to an output 248 of multiplier 95, to produce at its output 99 a substantially DC signal which is the output signal of the phase locked loop 81. Such information carrying signal is available on a line 101. Output 99 is also coupled to the input of a loop filter 96 whose output 98 controls the input of oscillator 97 in conventional fashion.

The output 245 of mixer 85 is coupled via line 102 to an input 103 of a mixer 104 to the other input 105 of which is coupled the output 242 of multiplier 95. The mixer 104 produces on its output 106 a signal which is the measure of the frequency of the signal on which the PLL 81 of a particular processing device 25 has locked itself, which, based on Doppler effect, permits to derive information about the location of the beacon which is the source of the signal in the course of processing. This information is derived and sent with $N_s$ to the regrouping unit 41 by a circuit not shown. These two informations may be sent back from the satellite to an earth located station.

In operation, the command unit 75 sends a strobe signal on line 241 at the input of the frequency synthetiser 82 of the particular processing device $UT_j$ which has been selected by the command unit, so that the respective frequency value $F_s$ which must be allocated to such selected device may be transferred to input 83 of the programming register of the frequency synthetiser 82 by means of a line which is common to all the frequency synthetisers of all the processing devices $25_l$ to $25_n$. Such frequency synthetiser is thus programmed with an estimate $F_s$ of a frequency detected in the input signal on input 87. A difference signal is produced at the output of mixer 85 to be mixed with this input signal. The band pass filter 89 at the output of the mixer 86 has a narrow, precisely positionned, center frequency which permits the processing of the detected frequency in the input signal (from the output 14 of the receiver 11) without disturbance from other signals even from those having a relatively close frequency to that of the detected signal corresponding to the frequency estimate.

The output of the filter 89 is phase compared with the very stable reference signal out of output 248 of the multiplier 95, by means of the mixer 92. A DC signal 99 representative of any phase difference between those two signals is present at the demodulating output 101 of the phase lock loop to control the level of the control voltage of oscillator 97 to produce an adjustable frequency at the output thereof which is mixed with the frequency estimate by mixer 85.

During the pure carrier wave portion preceding the message per se of a signal at the input of the processing device, the phase locked loop operates to tend to lock itself to such carrier frequency. The closer the frequency estimate $F_s$ entered in the frequency synthetiser 82 is to the detected frequency in the input signal, the quicker such locking may take place.

On the other hand, if such phase lock does not take place, (as indicated, for example, by a signal at output 249 of the loop filter 96 by a level detector), after a predetermined period of time, an indication is produced that the processing device is available for receiving a new frequency estimate on its programming input.

Figure 6:
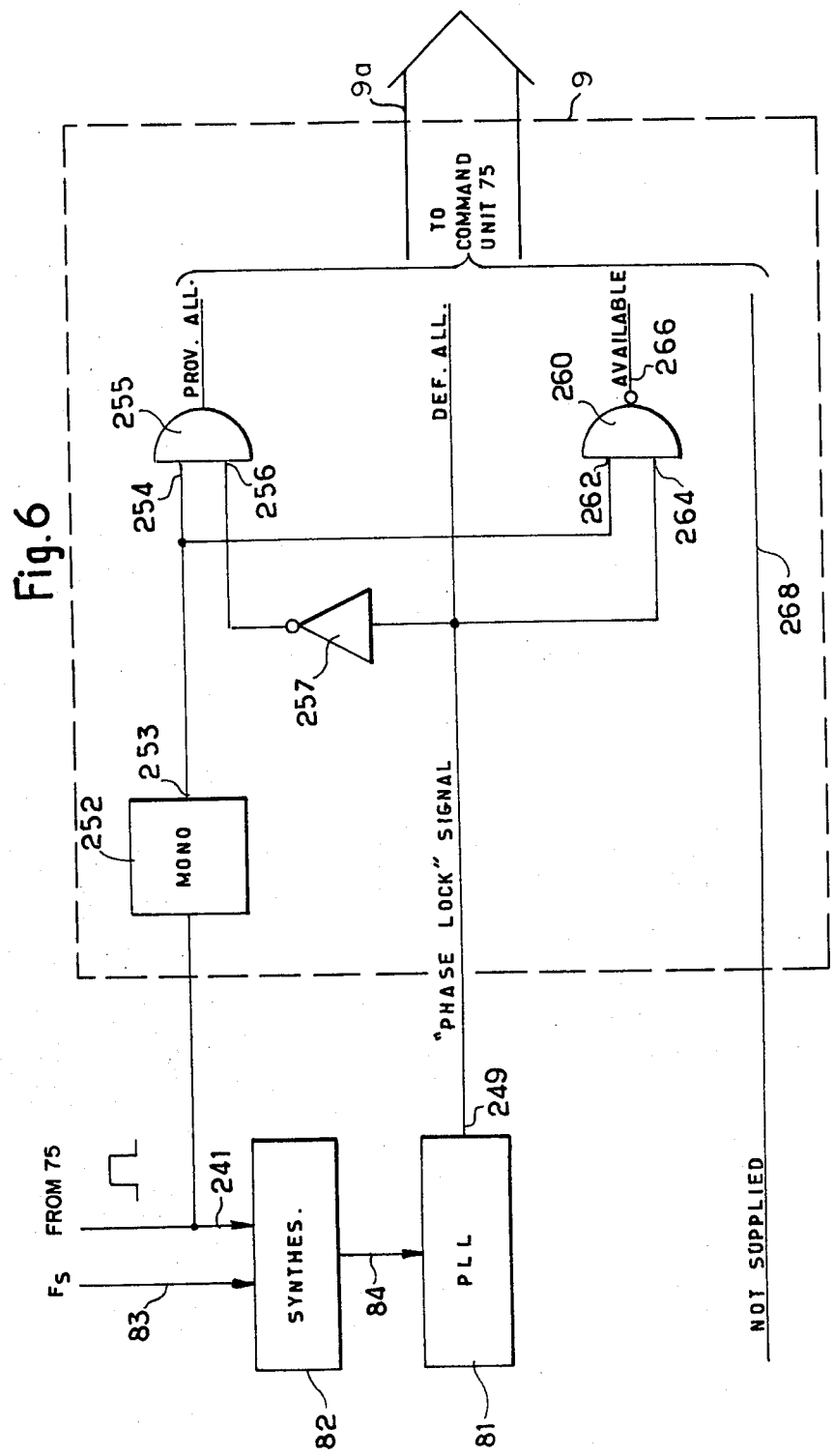
FIG. 6 is a schematic diagram of circuitry from a processing device to the command unit.

The processing device sends on line 9a to the command unit 75 a certain number of indications as to its state or condition. FIG. 6 illustrates schematically a circuit diagram 9 for producing on line 9a indications of four possible states which the processing device may assume:

a. a "not supplied" state, i.e. when the processing device is automatically put out of service (NOT SUP.);

b. a "supplied and available" state (AVAIL.);

c. a supplied and in provisional allocation state (PROV. ALL); and d. a supplied and in definitive allocation (DEF ALL) state.

With reference to FIG. 6, when the strobe line 241 is energized by the command unit 75, the strobe signal triggers also a monostable device 252 whose output 253 is connected to one input 254 of AND gate 255. The output 84 of the synthetiser is shown connected to the phase locked loop circuit 81 the output 249 of which is energized when a phase lock signal is present at the output of this loop. Output 249 is connected to a second input 256 of AND gate 255 via an inverter 257. The output of AND gate 255 delivers a "provisional allocation" (PROV. ALL) signal when simultaneously the monostable 252 remains energized in response to the strobe on line 241 for a predetermined period of time and no phase lock signal is present at the output 249 of the phase lock loop.

The output 249 when energized is connected to a "definitive allocation" output which simply indicates that phase locked loop 81 has locked itself on the input signal frequency in response to the frequency estimate assigned to the synthetiser 82.

A two inputs NAND gate 260 has one of its inputs 262 coupled to the output 253 of the monostable 252 and the other to the output 249 of the phase lock loop (input 264) to produce at the output 266 of such NAND gate an "available" (AVAIL) signal indicating that the processing device is neither in the provisional allocation state nor in a definitive allocation state. Finally, a last line 268 carries an indication of the supplied or not supplied (NOT SUP.) state of the processing device $UT_i$ concerned.

The "available" condition of the processing device is indirectly determined by signals coming from a data demodulation unit, not shown, which is connected to the phase locked loop 81 and in effect will re-establish of the "available" condition after a predetermined overall message processing time has elapsed. Such time processing window may have a duration determined by information carried at the beginning of the message which is in the course of being processed. In addition, the demodulating unit is arranged to stop the processing of any signal immediately if message bit rate is not acquired after a predetermined period of time and, later on, if the synchronisation word is not acquired within a predetermined period of time following the acquisition of the bit rate, all in accordance with conventional data telemetry techniques.

Figure 4:
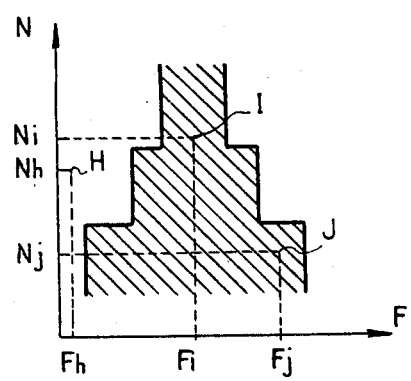
FIG. 4 is another graph.

The operation of the command unit 75 will first be described by considering the general operation principles thereof in relation to the schematic drawings of FIGS. 3 and 4.

Briefly stated, upon acquisition of each couple of values $F_s$ and $N_s$ from A/D converter 69 and from sequencer 71, as previously explained with reference to FIGS. 2 and 5, the command unit proceeds with allocating this couple of values to one of the processing devices $25_p$ (also called $UT_p$ in what follows) through a procedure which is designed to minimize the idle time of any processing device and to maximize the accuracy of the signal detection and demodulation by these devices. The result of this allocation procedure is essentially the allocation of a frequency estimate value to frequency synthetiser 82 of the selected processing device 25. The frequency estimates at the output of command unit 75 are determined with an accuracy of the order of several tens of hertz in correspondence with the pass characteristics of the filter 62 of each filtering channel 51.

Figure 3:
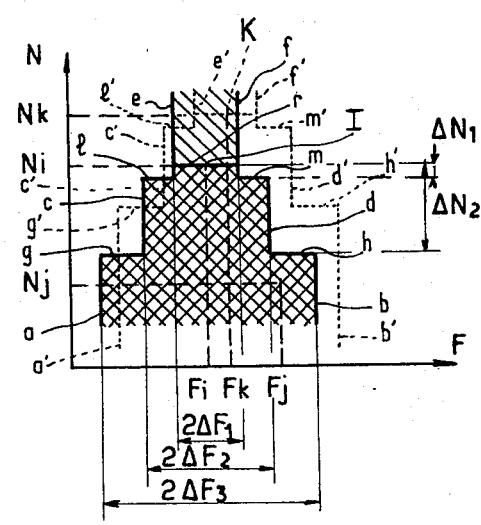
FIG. 3 is a graph.

In the graph of FIG. 3, the frequencies are marked on the abscissae and the levels on the ordinate. The point I on this graph represents a signal of frequency $F_i$ and level $N_i$ as transmitted to a processing device 25. A cross-hatched portion is limited by vertical lines a,b,c,-d,e,f, symmetrical with respect to the vertical of the abscissa $F_i$ and by horizontal line g,h,l,m, and r, the vertical lines a, d being closer to each other than the vertical lines a,b, and not as close as the vertical lines e, f. (The arrangements of the verticals and horizontals and their number are given here by way of example).

On FIG. 3, the various predetermined distances values $\Delta N_1$, $\Delta N_2$ between the horizontal lines of the stairlike pattern have been shown as well as the predetermined distance values $2\Delta F_1$, $2\Delta F_2$ and $2\Delta F_3$ between the various vertical lines of this pattern. The role of these boundary values will be defined later. As soon as a couple of frequency and level values is known, a respective such pattern is defined by the values $\Delta N_1$, $\Delta N_2$, $\Delta F_1$, $\Delta F_2$ and $\Delta F_3$ which may be attached to this couple of values.

The command unit 75 is such that for a signal received by the receiver 11 which corresponds to values F and N for which the representative point of the signal is located below the horizontal line r passing through point I and including inside the surface limited by the stairlike contour or pattern defined hereinabove, said signal is not routed to the processing device $25p$ receiving signal I, nor in effect to any other processing device.

On the other hand, for a signal represented by a point located above the horizontal r the level of which is greater than $N_i$ and included between the verticals e and f as represented by point K, this one is routed to the processing device to replace the couple represented by the point I.

Simultaneously the command unit assumes a condition for which the graph related to said processing device is no longer the one defined above but results from the latter by a displacement by translation representative vector is the vector IK.

Such a surface, or pattern, is then in a new condition limited by the vertical lines shown in dotted lines a', b', c', d', e', f', and the horizontal lines g', h' and l', m' which result from the lines a,b,c,d,e,f, and g,h,l,m, respectively, by translation representable by vector IK. Thus, after signals which correspond to the couple $F_i$ $N_i$ represented by the point I are allocated to the processing device, then the signals which correspond to the couple $F_kN_k$ represented by point K, are allocated to the same processing device $25_p$.

It will be understood that this pattern moving process will be continued as long as, during the frequency scanning which takes place in the frequency analysis circuit 16, a signal of higher level N will be found in the prescribed bandwidth $2\Delta f_1$, these higher levels corresponding to a signal which, as combined with the sweep frequency out of oscillator 55, becomes closer and closer to the center frequency of a respective one of the filters 62. After a period of time, such combination of the input signal frequency and the sweep frequency will go beyond the center frequency of the filter and the corresponding level detected at the output of the respective channel 59 will start to decrease. In accordance with the procedure described, these new levels of lower values will not be retained for the processing and the processing device $25_p$ will be allowed to operate on the basis of the couple of values F,N which correspond to the maximum level detected. Command unit (75) is operative to control the progressive reactualization of this pattern, or provisional allocation pattern, in following the various couples of value $F_s$, $N_s$ until no greater level value is found.

When a given couple of values $F_s$, $N_s$ has been allocated to a given processing device $UT_i$, this allocation which was provisional may become definitive when, as explained above in connection with FIG. 6, the phase locked loop 81 of $UT_i$ locks itself on an input signal in response to the allocated frequency $F_s$. An inhibit pattern substantially like that represented by FIG. 3 then continues to be used under somewhat different conditions as described now with reference to FIG. 4.

This pattern has a similar configuration to the provisional allocation pattern. It is considered here to result from the provisional allocation pattern shown in FIG. 3 when it is in the position shown in solid lines, that is to say, corresponding to the couple $F_i$, $N_i$.

The pattern according to FIG. 4 or the definitive allocation pattern does not, however, include any horizontal line like the horizontal r dividing the provisional allocation pattern into a first part or zone 1 and a second part or zone 2 below said horizontal for which the points representative of the signals have their routing to said processing device inhibited.

The cross hatched zone of the inhibit pattern after definitive allocation corresponds in its entirety to an inhibition. For example, if during the processing of a message by the processing device of the representative point of which is represented at I, with abscissa $F_i$ and ordinate $N_i$, there arrives at the receiver station a signal represented by the point J, in the cross hatched portion, inside the inhibit pattern, the command unit 75 inhibits the routing of the signal to the device the operation of which thus remains assured. And this is so even if the incoming signal has a level greater than $N_i$.

In this condition, the received signals are not taken into account if they are inside the inhibit pattern. They are taken into account by another processing device if they are outside said pattern and such a device is available. The inhibit pattern is selected so that it encompasses the frequency spectrum of any message being demodulated on which the processing device has locked itself after definitive allocation of a frequency estimate. This conditions the selection of the various $\Delta_N$ and $\Delta_F$. It has the advantage that after a processing device is in the definitive allocation state and, accordingly, a message following the pure carrier wave portion of the input signal is being demodulated by the processing device, no couple of values $F_s$, $N_s$ arising out of this signal being demodulated and detected at the output of the frequency analysis circuit 16 may be retained by the command unit 75 for possible allocation to another processing device. Any such couple of values will be automatically rejected to avoid any undue occupation of another processing device by data issued from a message already in the course of a processing.

The equipment thus permits the best routing of the received signals to the processing apparatus 24 by routing to a processing device $25_p$ an incoming signal if the device is available, or free, and after putting said processing device into the best condition for processing said signal, the adjustment frequency of said processing device, or rest frequency of its phase loop, then being sufficiently close to that of the signal which is applied at the input thereof so that it may be operational with respect to the latter.

During this phase, a processing device is successively positioned at frequencies which become closer and closer to the frequency which is that of the signal for the transmission of the message. When, during scanning, the transmission frequency of the message is passed, the processing device is practically frequency positioned from which there is a savings in time for acquisition.

As long as the received signal is not the best from the standpoint of level with respect to its processing in the device 25 to which it may have access, another signal may be applied to said device whose characteristics show that its processing will be easier or less disturbed.

The inhibit pattern avoids taking into account signals which would not be properly processed both for locating and gathering data. It also avoids taking into account the modulation lines accompanying the message carrying portion of a signal which is in the course of being processed. Thus, the allocation procedure is effectively limited to couple of values $F_s$, $N_s$ which correspond to the pure carrier wave portions preceding the message portion of the signals which are detected in the course of the spectrum scanning by the frequency scanning apparatus 16. The progressive adaptation of the frequency estimate assigned to the processing device is effected during the course of a single scanning of the spectrum analyser 16.

On the other hand as soon as the allocation of a signal to a processing device is definitive, said processing device, phase locked to a signal, is left in its processing condition no matter what signals reach the receiver.

Thus, to summarize this discussion of the principles of operation of the command unit, when a new couple of values $F_s$, $N_s$ is acquired at the output of circuit 16, the command unit 75 scans the processing devices $25_l \ldots 25_n$ in an ordered sequence to determine whether the new couple of values is within anyone of the inhibit patterns attached to the processing devices. If it is, and the respective processing device is in the definitive allocation state, the couple of values is rejected; if the processing device is in the provisional allocation state and the level value of the new couple is higher than that which was provisionally allocated thereto a new provisional allocation is made on the basis of the new couple; otherwise the new couple of value is also rejected.

If the new couple is outside the inhibit pattern of every processing device it is first directed to the first supplied and available processing device in the ordered sequence. If no processing device is supplied and available, a survey is made of all the processing devices which operate under a provisional allocation condition to determine if one of them operates on a level value which is lower than that of the new couple of values and if such is the case this new couple of values is provisionally allocated to that processing device.

It will be understood that the phase locked loop of each of the processing devices is constantly attempting to lock itself to a frequency component in the input signal in response to the last frequency estimate set to its associated frequency synthetizer.

An embodiment of the command unit 75 capable of carrying out the allocation procedure just summarized will now be described with reference to FIGS. 7 through 9. According to this embodiment, a programmable processor, for example a microprocessor, is used to carry out a series of processing steps. This microprocessor operates in connection with various counters, memories and registers as will be indicated in the course of the following description.

In particular, the command unit 75 comprises the frequency data register $F_s$ 235 described with reference to FIG. 5 and level data register $N_s$ 260 which is connected to the output of the A to D converter 69. These registers 235 and 260 thus store a couple of values $N_s$, $F_s$ for period of time which corresponds to the switching period of the multiplexer 66. In the following description processing devices such as $25_1 \ldots 25_n$ of FIGS. 1 will be designated by $UT_1 \ldots UT_n$ and are surveyed in this order.

Figure 7:
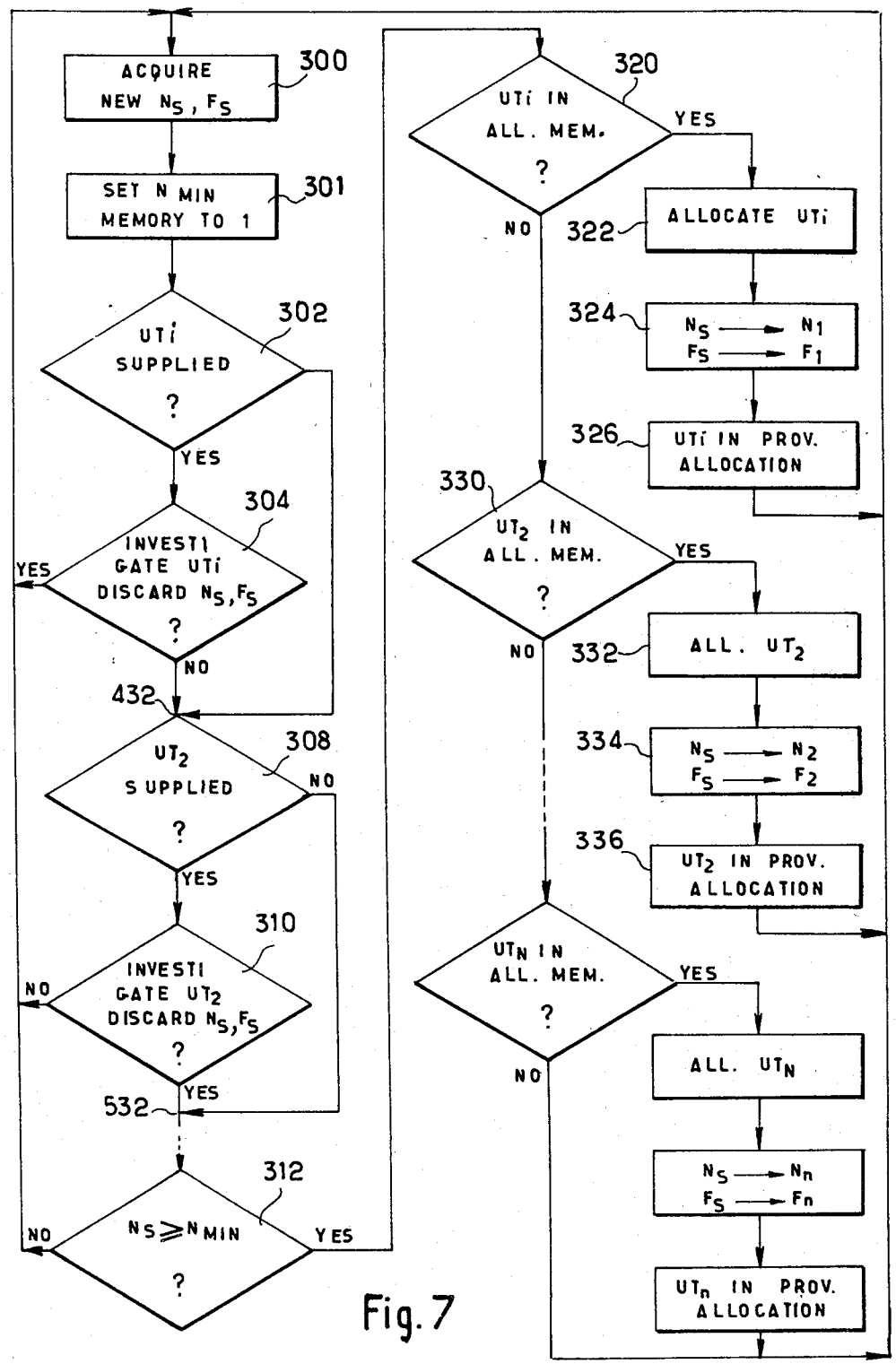
FIG. 7 is a flow chart diagram corresponding to one embodiment of the command unit.

Referring now to FIG. 7, after the values $N_s$ and $F_s$ of the couple of values have been acquired (box 300) a memory $N_{min}$ is set to one, i.e. maximum level value, (box 301) before the program proceeds to a decision box 302 to determine whether the processing device $UT_1$ is supplied. If NO, the program proceeds to determine whether the next processing device in line $UT_2$ is supplied (decision box 308). If answer to box 302 is YES, program proceeds to investigate the status of the processing device $UT_1$ and will determine is the values $N_s$ and $F_s$ must be discarded on the basis of the inhibit pattern attached to the processing device $UT_1$. If YES, the program goes back to box 300 and waits for the acquisition of a new couple $N_s$, $F_s$. If the answer is NO, i.e. corresponding to either a decision of allocation of the couple $N_s$, $F_s$ to the processing unit $UT_1$ or to a decision to investigate the other processing devices for possible allocation of this couple, the program proceeds to decision box 308 to check whether the next processing device in line is or not supplied and then if YES, to box 310 to investigate processing device $UT_2$ to decide upon discarding or not the couple $N_s$, $F_s$.

The program proceeds in similar manner with all the processing devices and if the last decision box similar to boxes 304 and 310 is passed without discarding the couple $N_s$, $F_s$, it proceeds to check the value of $N_s$ with respect to the minimum value stored in memory $N_{min}$ (decision element 312). If the value $N_s$ is not greater than that in the minimum level memory, program discards $N_s$ and $F_s$ and returns to box 300. If it is greater, then a so-called "allocation memory" (ALL MEM) is checked to determine if an indication of one of the processing devices $UT_1 \ldots UT_A$ has been stored in this memory during the course of one of the investigation steps 304, 310, etc . . . If a code corresponding to processing device $UT_1$ has been found in the allocation memory, (decision box 320), the couple of values $N_s$, $F_s$ is allocated to the processing device $UT_1$ (box 322) (by sending a strobe to the respective frequency synthetizer input 241) then the $N_s$ value is stored into a memory $N_1$ and the $F_s$ value into a memory $F_1$, both memories $N_1$ and $F_1$ being affected to the processing device $UT_1$ (box 324), and then an indication is kept that the processing device $UT_1$ is in the provisional allocation condition (Box 326) before returning to box 300 to acquire a new set of values $N_s$, $F_s$.

If the answer to decision a box 320 is negative, the interrogation of the allocation memory is renewed with respect to processing device $UT_2$ (box 330) and if the answer is YES, the program proceeds as in the case of processing device $UT_1$ with boxes 332, 334 and 336 corresponding to the allocation to processing device $UT_2$, the setting of $N_s \ldots F_s$ into memories $N_2$ and $F_2$ attached to processing device $UT_2$, and the entry into memory of an indication that $UT_2$ is in provisional allocation.

If the answer to decision element 330 is NO, then the program proceeds again to interrogate the allocation memory to determine if the next or any one of the following processing devices in the prescribed order has been entered in the allocation memory and so on.

Figure 8:
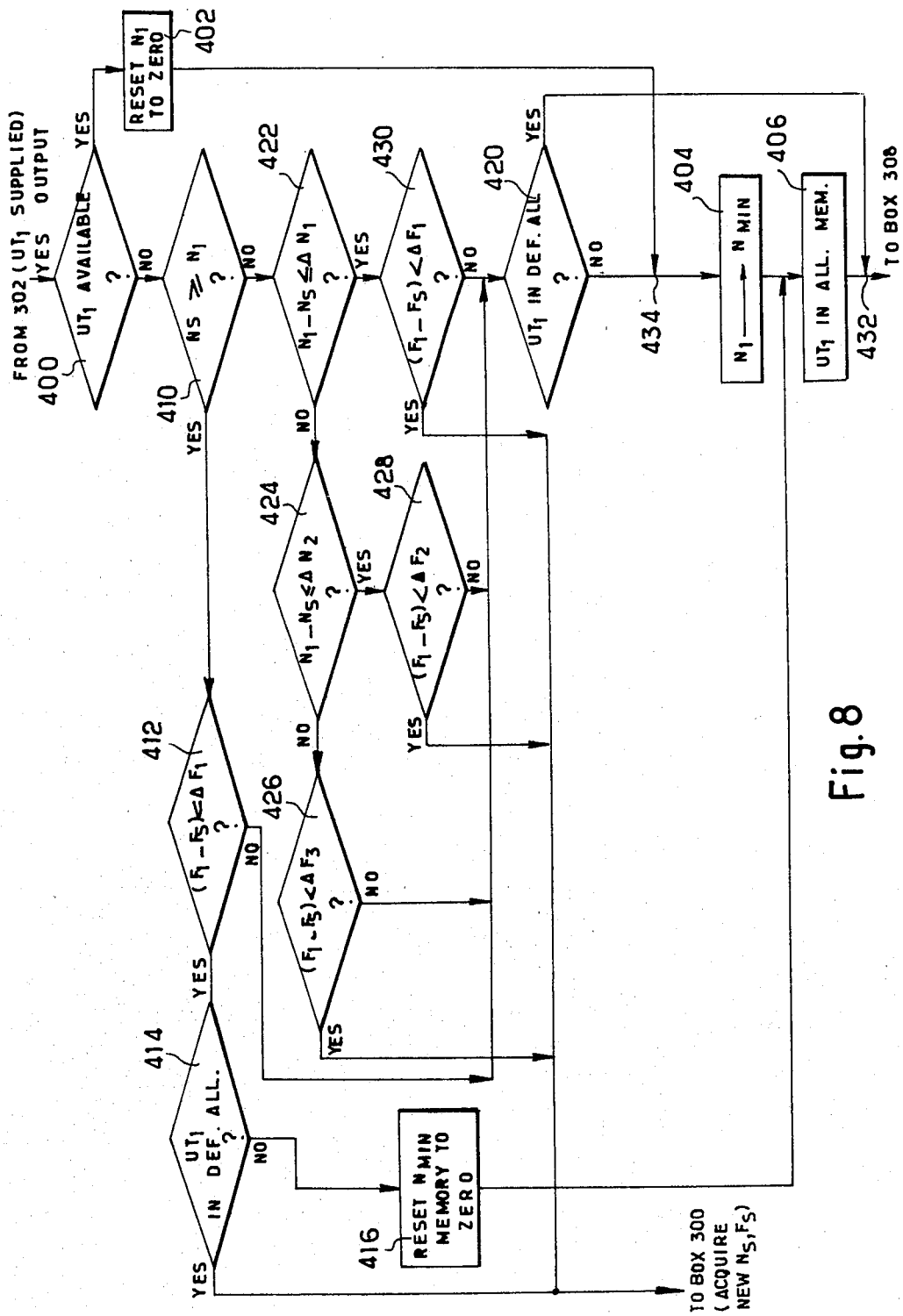
FIGS. 8 and 9 are flow chart diagrams depicting subroutines of the flow chart diagram of FIG. 7.

Turning now to FIG. 8, the investigation and discarding procedure of decision box 304 in FIG. 7 is expanded. Similarly, the procedure of decision box 310 is expanded in FIG. 9.

If processing device $UT_1$ is supplied (FIG. 6, line 268) (YES output of decision element 302) decision element 400 (FIG. 8) determines if the processing device $UT_1$ is available (line 266 in FIG. 6). If it is, memory $N_1$ is reset to zero (box 402) and the content of memory $N_1$ which is associated with the processing device $UT_1$ is transferred via junction 434 into the $N_{min}$ memory (box 404), after which a code corresponding to the processing device $UT_1$ is stored in the allocation memory (box 406) and the program proceeds with the interrogation of box 308 in FIG. 7.

If the result of investigation of box 400 is negative, i.e. the processing device $UT_1$ is busy, it is determined if the level $N_s$ of the couple of values just acquired is greater than the level currently in the $N_1$ memory (box 410). If it is, a check is made to determine if the difference between the new frequency value $F_s$ and the former frequency value $F_1$ allocated to processing device $UT_1$, is smaller than $\Delta F_1$ (see box 412) in accordance with the principles described in relation to FIGS. 3 and 4. If such difference is smaller than $\Delta F_1$, this is an indication that the new couple of data $F_s$, $N_s$ is within the inhibit pattern and at a level above that of the previously allocated signal level. The program then determines (box 414) if processing device $UT_1$ is in a definitive allocation condition and, in the affirmative, proceeds to exit the new couple of values, and goes back to box 300 of FIG. 7 to acquire a new couple of values $N_s$, $F_s$. This is in accordance with the principles previously set forth according to which a processing device which is in the definitive allocation condition is left undisturbed.

If the processing device $UT_1$ is not in the definitive allocation condition, the memory $N_{min}$ is reset to zero (box 416) and the program returns to box 406 to put $UT_1$ code in the allocation memory (box 406) before proceeding to box 308.

Returning to decision element 412, if the point of the graph of FIG. 3 is outside the inhibit pattern, as indicated by the NO output of element 412, the program proceeds to a decision element 420 to determine whether the processing device $UT_1$ is in definitive allocation condition and if so, proceeds to box 308 of FIG. 7 with the couple of acquired value $F_s$ and $N_s$, thus leaving processing device $UT_1$ undisturbed. If such device is not in definitive allocation condition (output NO of element 420), the memory $N_1$ content is entered into memory $N_{min}$ (box 404) and the programs after entering the $UT_1$ code in the allocation memory (box 406) proceeds to box 308 of FIG. 7.

Returning now to decision element 410, if the level of a newly acquired couple $N_s$, $F_s$ is smaller than the previously allocated level put in memory $N_1$, a decision box 422 determines if $N_1 - N_s$ is smaller than or equal to $\Delta N_1$, i.e. to check whether or not the newly acquired level is above or below the level of lines l and n of the pattern of FIG. 3. If it is not, the value of $N_1 - N_s$ with respect to $\Delta N_2$ is checked (box 424) and the result of this comparison is followed by a comparison of the absolute value $|F_1 - F_s|$ with $\Delta F_3$ (box 426) in case of a NO-answer to decision element 424; in case of a YES answer, $|F_1 - F_s|$ is compared with $\Delta F_2$ (box 428). All these comparisons in effect tend to determine whether the point representation of the newly acquired couple of values is inside or outside the inhibit pattern of FIG. 3. If it is inside, as indicated by the outputs YES of decision elements 426 and 428, the newly acquired couple of values is discarded (return to box 300). If it is not, as indicated by the NO-outputs of elements 426 and 428, the program proceeds to decision element 420 to check whether the processing device $UT_1$ is in definitive allocation state or not and then proceeds as explained above.

Finally, if decision element 422 indicates that the point corresponding to the newly acquired couple $N_s$, $F_s$ is above the level of lines 1 and m but below that of line r, the program checks (decision element 430) whether this point still is within the pattern by comparing $|F_1-F_s|$ to $\Delta F_1$. If it is smaller (YES answer), the newly acquired couple is discarded. If it is not (NO answer), the program proceeds to decision element 420.

In summary, the flow chart of FIG. 8 essentially determines whether the newly acquired couple of values must be discarded or whether it must be retained and, in the latter situation, whether it may be retained for allocation to the processing device $UT_1$, in which case the $UT_1$ code is entered in the allocation memory (box 406), or whether this newly acquired couple should be passed directly to the other processing devices, when the processing device $UT_1$ is in definitive allocation condition.

Figure 9:
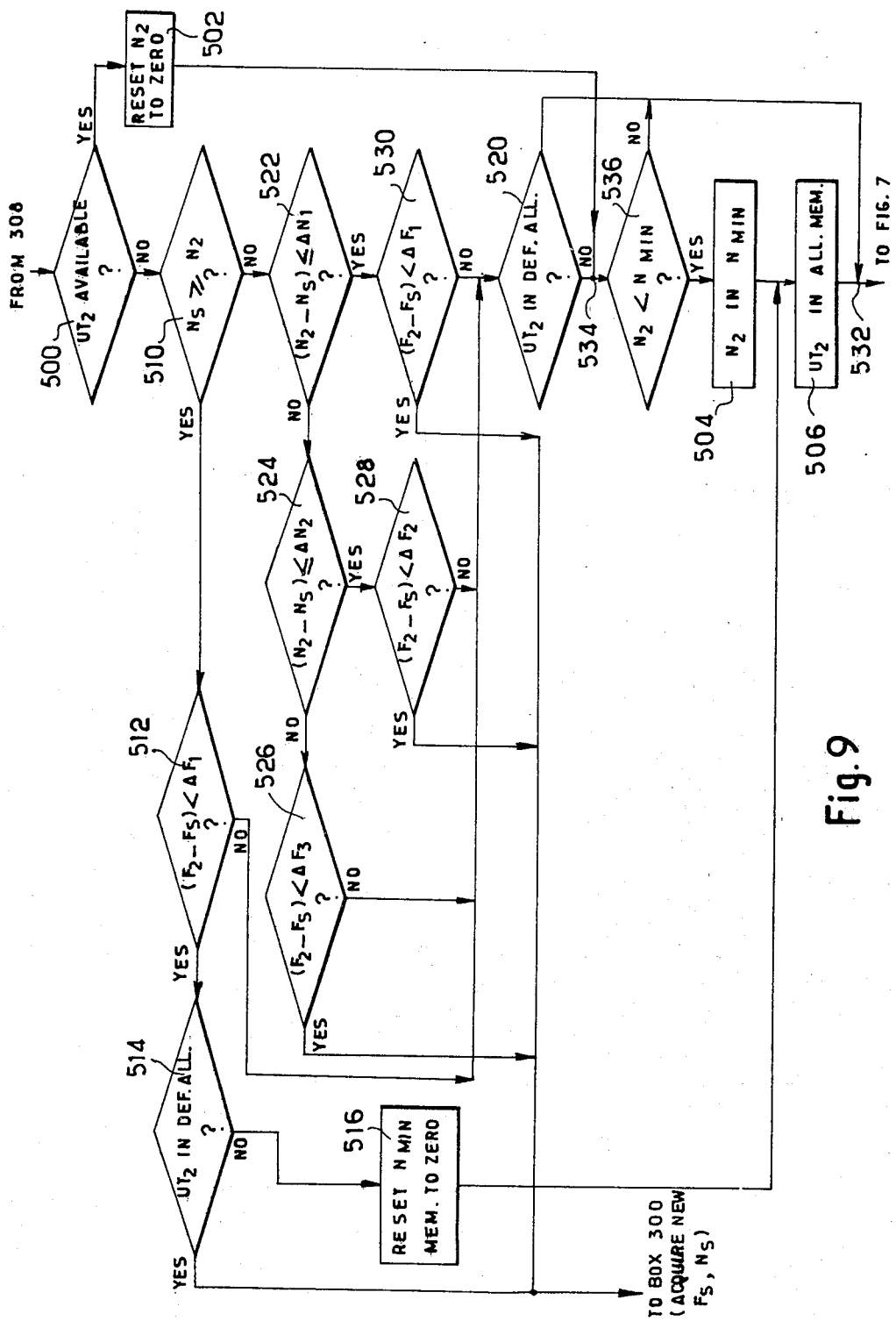

The procedure illustrated by FIG. 9 for the processing device $UT_2$ corresponds exactly, with one exception, to that of FIG. 8 and consequently the description thereof will not be repeated. Boxes corresponding to any of boxes 400 to 430 of FIG. 8 have been referenced with numbers of the 500 series having the same last two digits as those of FIG. 8.

In FIG. 9, $N_2$ is the level value currently allocated to the processing device $UT_2$ and which is entered in a memory $N_2$ specially affected to this processing device $UT_2$. Similarly, $F_2$ is a frequency value affected to processing device $UT_2$ as memorized in memory $F_2$.

Contrary to the diagram of FIG. 8 where the NO output of element 420 as well as the output of block are joined at point 434 to the input of block 404, the respective outputs of blocks 520 and 502 which are joined at point 534 are coupled to the input of a decision element 536 which determines whether $N_2$ is smaller than $N_{min}$ whereby, if such is the case, (YES answer) the value of $N_2$ is put into the $N_{min}$ memory (block 504) and program goes on with the setting of the $UT_2$ code in the allocation memory (block 506). If, to the contrary, the $N_2$ value is greater than $N_{min}$ (NO output of element 536), the program directly proceeds to point 532, i.e. by-passing blocks 504 and 506 to proceed with the review of the other processing devices without allocating the newly acquired set of values $F_s$ and $N_s$ to processing device $UT_2$.

For each processing device following $UT_2$ in the order of interrogation of these devices by the program, a procedure such as carried out by box 310 for the $UT_2$ is followed. In other words, for all these processing devices $UT_2$ through $UT_n$, not only is a determined made of whether the newly acquired set of values is within or without the inhibit pattern depicted in FIGS. 3 and 4, but a determination is also made of the value of the currently allocated level value N with respect to a level minimum value stored in memory $N_{min}$. This is used to determine which one of the processing devices has been provisionally allocated the value of the lowest level, as indicated by memory $N_{min}$, at the end of the interrogation of all the processing devices.

At the end of this interrogation process, as indicated in FIG. 7, decision box 312 determines whether the newly acquired value $N_s$ is greater than this value stored in $N_{min}$, and the remainder of the program of FIG. 7 will be operative to allocate the newly acquired value $N_s$ to the processing device which was previously provisionally allocated the $N_{min}$ value. For example, if it turns out, after reviewing all the processing devices, that the value in the $N_{min}$ memory is that of $N_2$ (as stored in such memory by element 504 and followed by an entry of the $UT_2$ code the allocation memory, box 506) the program at the output of decision element 312 proceeds via element 320, to element 330 which will provide a YES answer to control an allocation of values $N_s$ and $F_s$ to the processing device $UT_2$.

If a processing device is in a non-supplied condition, the program attempts to allocate the newly acquired values $F_s$ and $N_s$ to the following processing devices in the ordered sequences $UT_1$, $UT_2$, etc . . .

When a processing device such as $UT_2$ is available (box 500, FIG. 9) the reset of the memory $N_2$ to zero (box 502) will be followed by entry of the zero value in the $N_{min}$ memory by operation of the elements 536 and 504 and the entry of the $UT_2$ code in the allocation memory (506).

As a result, unless the newly acquired couple of values $N_s$ and $F_s$ is discarded during the remainder of the interrogation of the processing devices, the end of the program (FIG. 7) will automatically result in an allocation of the newly acquired couple to the processing device $UT_2$ which has been associated with the zero level in the $N_{min}$ memory.

Figure 10:
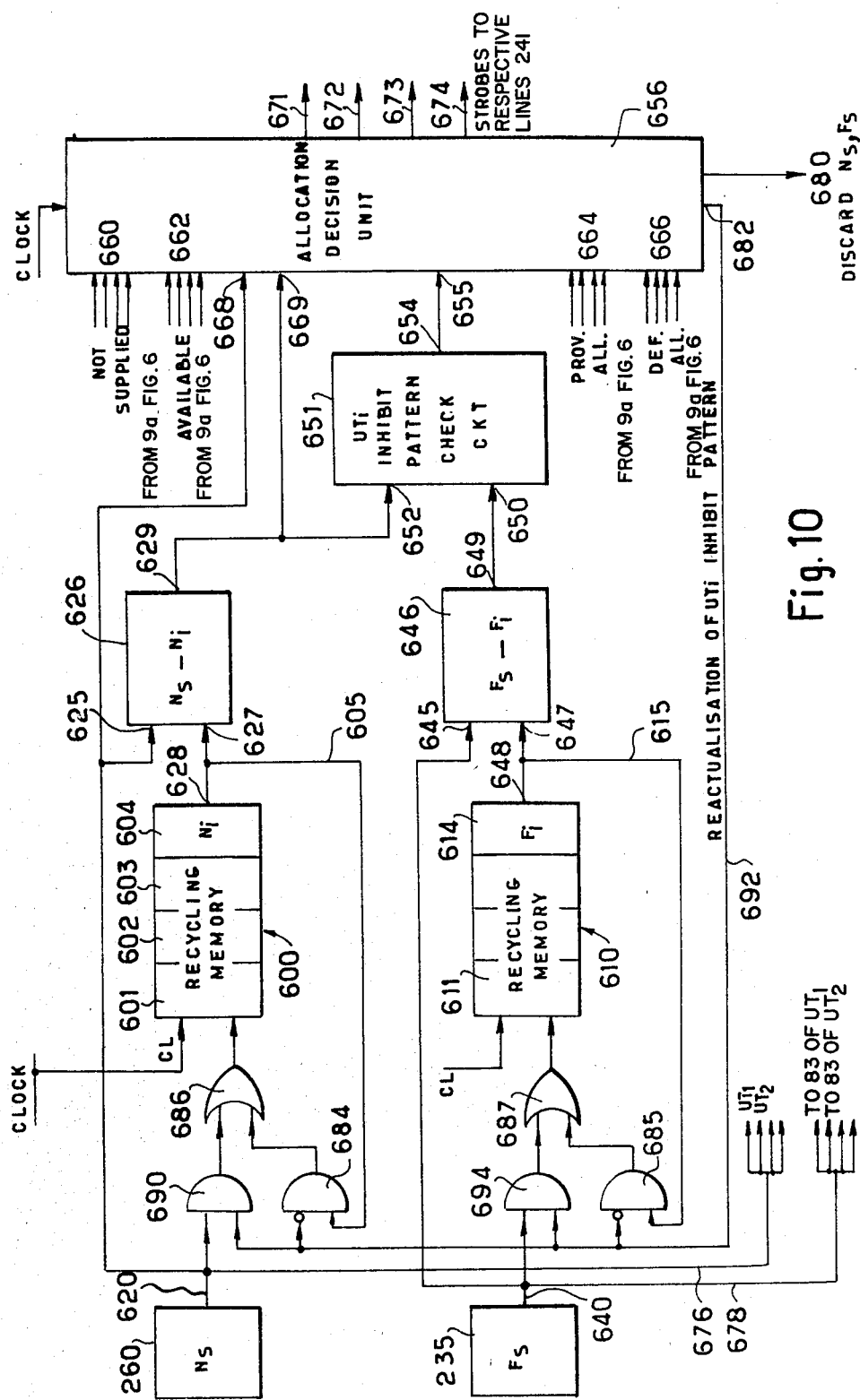
FIG. 10 is a schematic diagram of a hard wired embodiment of the command unit.

Referring now to FIG. 10, an embodiment of the command unit 75 in hard wired form will now be described, the operation of which follows very closely the flow of operations previously discussed in relation to FIGS. 7 to 9. The unit of FIG. 10 includes or comprises a $F_s$ generation register 235 identical with that depicted in FIG. 5 and a $N_s$ generation register 260 identical with that of FIG. 5 as well. The circuits which will be discussed in connection with FIG. 10 are designed to be operated in series mode, i.e. each data indication such as $N_s$ ou $F_s$ is transmitted serially along the connection lines between the various elements of the circuit under control of timing signals which determine the transmission of the bits corresponding to these respective data, in a manner well known by the man skilled in the art.

One assumes that number n of processing device UT is of four in this example. A level memory 600 has four memory stages 601 through 604 loop connected i.e. the data from one element 601 may be shifted to element 602 then 603 and then 604 and the content of element 604 may be retransferred to element 601, by a loop connection 605.

A frequency memory 610 with four loop connected memory stages 611 through 614 is provided for the frequency data allocated to the four processing devices in a manner similar to what has been indicated for the level memory 600. Output 628 of memory 600 is coupled to a $N_s-N_i$ difference circuit 626 and output 648 is coupled to a $F_s-F_i$ difference circuit 646.

In operation, a couple of values $N_s$ and $F_s$ is stored in registers 260 and 235 respectively which have been newly acquired. The level values allocated to processing devices $UT_1$ to $UT_4$ are stored in respective stages of the recycling memory 600 which issues at the output 628 thereof a series bit signal representative of the content of the level memory $N_i$, corresponding to the processing device $UT_i$ being currently processed, at the input of $N_s-N_i$ difference circuit 626 while the other input 625 of this circuit receives a direct serial bit indication from $N_s$ register 260.

Similarly, a difference bit signal $F_s-F_i$ is produced at an output 649 of difference circuit 646 whose input 645 receives directly a serial bit signal representative of $F_s$ from the $F_s$ register 235 and whose input 647 receives a series bit indication of the memorized value $F_i$ from output 648 of recycling memory 610.

The values entered in each stage of the recycling memories corresponding to a respective processing device $UT_1$ through $UT_4$ are advanced cyclically under control of a clock signal CL which is also used as will be explained later with reference to FIG. 12 to increment a $UT_i$ counter whose content is a coded indication of the processing device which is being currently investigated for a possible allocation of the newly acquired couple of data $N_s$ and $F_s$.

Figure 11:
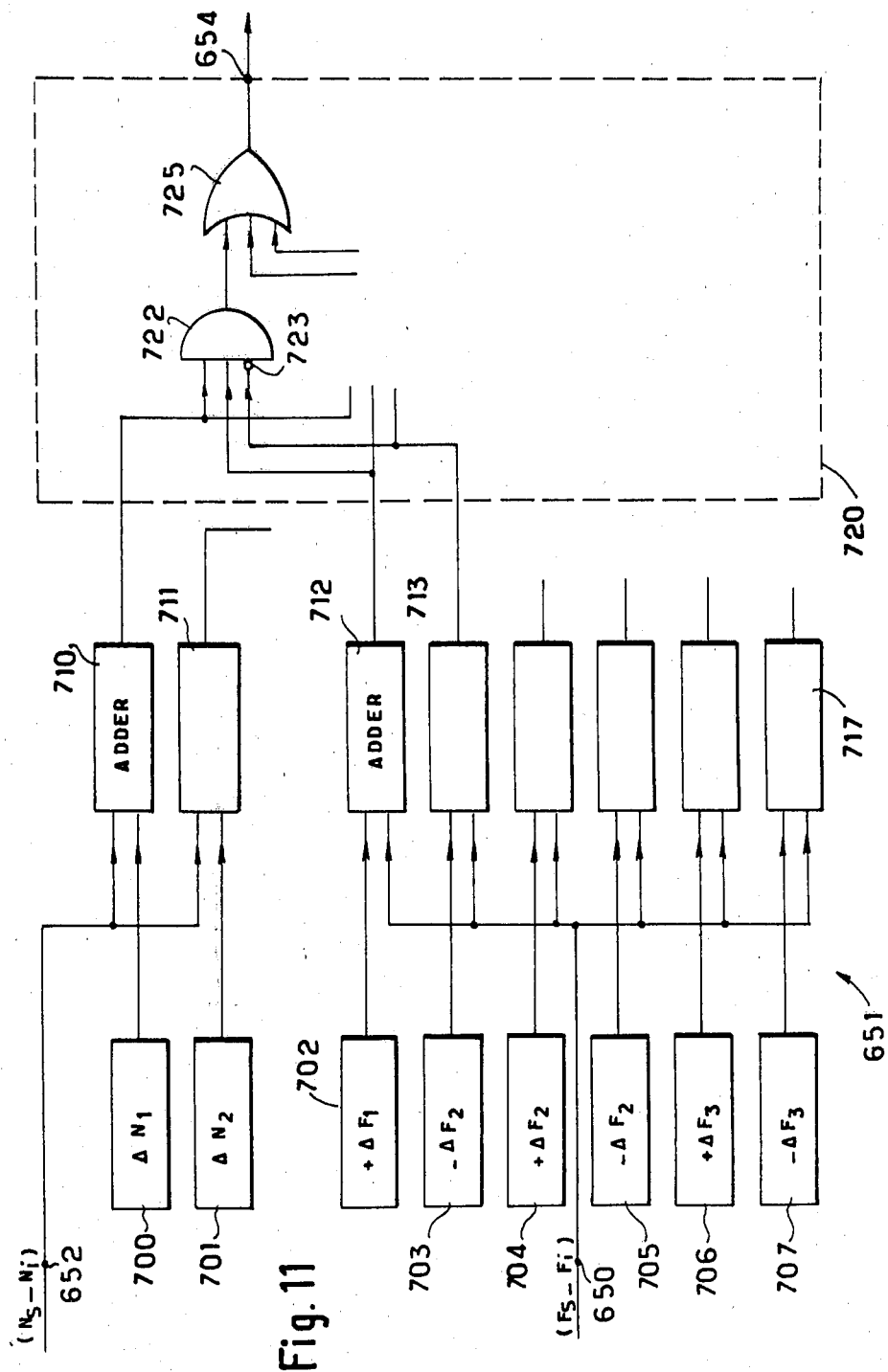
FIGS. 11 and 12 are diagrams of a inhibit pattern circuit and of an allocation decision circuit of FIG. 10, respectively.

The difference values at the outputs 629 and 649 of the difference registers 626 and 646 are applied to inputs 652 and 650 respectively of a $UT_i$ "inhibit pattern check circuit" 651 which is illustrated in more detail in FIG. 11 and operates to provide at its output 654 a signal indicating if a given couple $N_s$, $F_s$ is within or without the inhibit pattern attached to the processing device $UT_i$ currently checked. This indication is forwarded to one input 655 of an "allocation decision unit" 656 which receives also: the clock signal CL; the four $UT_i$ "not supplied" lines on inputs 660; the four "available" lines (FIG. 6) on inputs 662; the four "provisional allocation" lines on inputs 664; and the four "definitive allocation" lines on inputs 666. The allocation decision unit 656 also has an input 668 coupled to output 620 of register 260 and a difference $N_s - N_i$ input 669 connected to output 629.

The allocation decision unit 656 has four outputs 671, 672, 673 and 674 respectively connected to respective inputs 241 of the frequency synthetiser 82 of processing devices $UT_1$ through $UT_4$ respectively, for transmitting a strobe signal controlling the allocation of the newly acquired couple of data $N_s$ and $F_s$ to a processing device $UT_i$ selected by the command unit 75. The allocated data are transferred to the respective processing device via lines 676 and 678 out of registers 260, 235 respectively. Circuit 656 also has reset output 680 which, when energized resets all circuits of FIG. 10 to zero including the registers $N_s$ and $F_s$.

Under control of the signal CL, each value in memory 601 is transferred to memory 602 and from memory 602 to 603 and so on. The transfer of each value is made bit by bit under control of an appropriate timing signal. The content of memory stage 604 may be recycled via AND gate 684 and OR gate 686 to the stage 601 of the recycling memory via a line 605. Similarly, the content of a stage 614 of the $F_i$ memory may be recycled via line 615, AND gate 685 and OR gate 687 to the stage 611.

Instead of having its content refreshed by line 605, the stage 601 may be directly updated by the $N_s$ content of register 260 via an AND gate 690 and OR gate 686, AND gate 690 being enabled by a line 692 issued from an output 682 of the "allocation decision unit" 656 which at the same time inhibits AND gate 684. In this manner, when a signal is present at the output 682, the content of a stage 601 is reactualized with the $N_s$ level data, so as to reactualize the inhibit pattern affected to the respective $UT_i$ processing device. Similarly, the content of a stage 611 of the $F_i$ recycling memory 610 may be updated by the $F_s$ value by means of AND gate 694 having its output coupled to the stage 611 through OR gate 687 and which is enabled by the signal of line 692 which also inhibits the conduction of AND gate 685.

The $UT_i$ inhibit pattern check circuit 651 is briefly illustrated by FIG. 11. It essentially comprises a plurality of registers 700 through 707 which are each permanently loaded with respective bit values corresponding to:

$\Delta N_1$
$\Delta N_2$
$+\Delta F_1$
$-\Delta F_1$
$+\Delta F_2$
$-\Delta F_2$
$+\Delta F_3$
$-\Delta F_3$ The outputs of these registers 700 and 701 are coupled, to be read serially, to respective first inputs of two serial adders 710 and 711 which receive on their second input the signal $N_s - N_i$ out fo output 629 (input 652).

The output of these adders is at a logic level 1 if the result of the addition performed serially bit by bit, as explained before, under control of timing signals, is positive, and at a zero logic level if such result of the addition is negative.

Similarly, each of the registers 702 through 707 is coupled for serial reading to a respective input of serial adders 711 to 717 which receive on their other input series of bits corresponding to the signal $F_s - F_i$ (input 650) and deliver at their output a logic level 1 if the result of the addition is positive and a zero level if it is negative.

All the outputs of adding circuits 710 to 717 are connected to a gating logic 720 whose output is the output 654 of the circuit 651. This gating logic is operative to combine the results of the comparison of the difference signals present on inputs 652 and 650 with the boundary values $\Delta N_{1,2}$ and $\Delta F_{1,2,3}$ to determine whether the newly acquired couple of values $N_s$ and $F_s$ corresponds to a point within or without the inhibit pattern attached to the processing device $UT_i$. For example, the output of adders 710, 712 are coupled to respective direct inputs of AND gate 722 having a third inverting input 723 coupled to the output of adder 713, so as to issue an output signal which is indicative of whether the point representative of the couple $N_s$, $F_s$ is within the pattern of FIG. 3 above the level of lines l and m. This indication is sent to one input of an OR gate 725 whose output forms the output 654 to decision unit 656.

Figure 12:
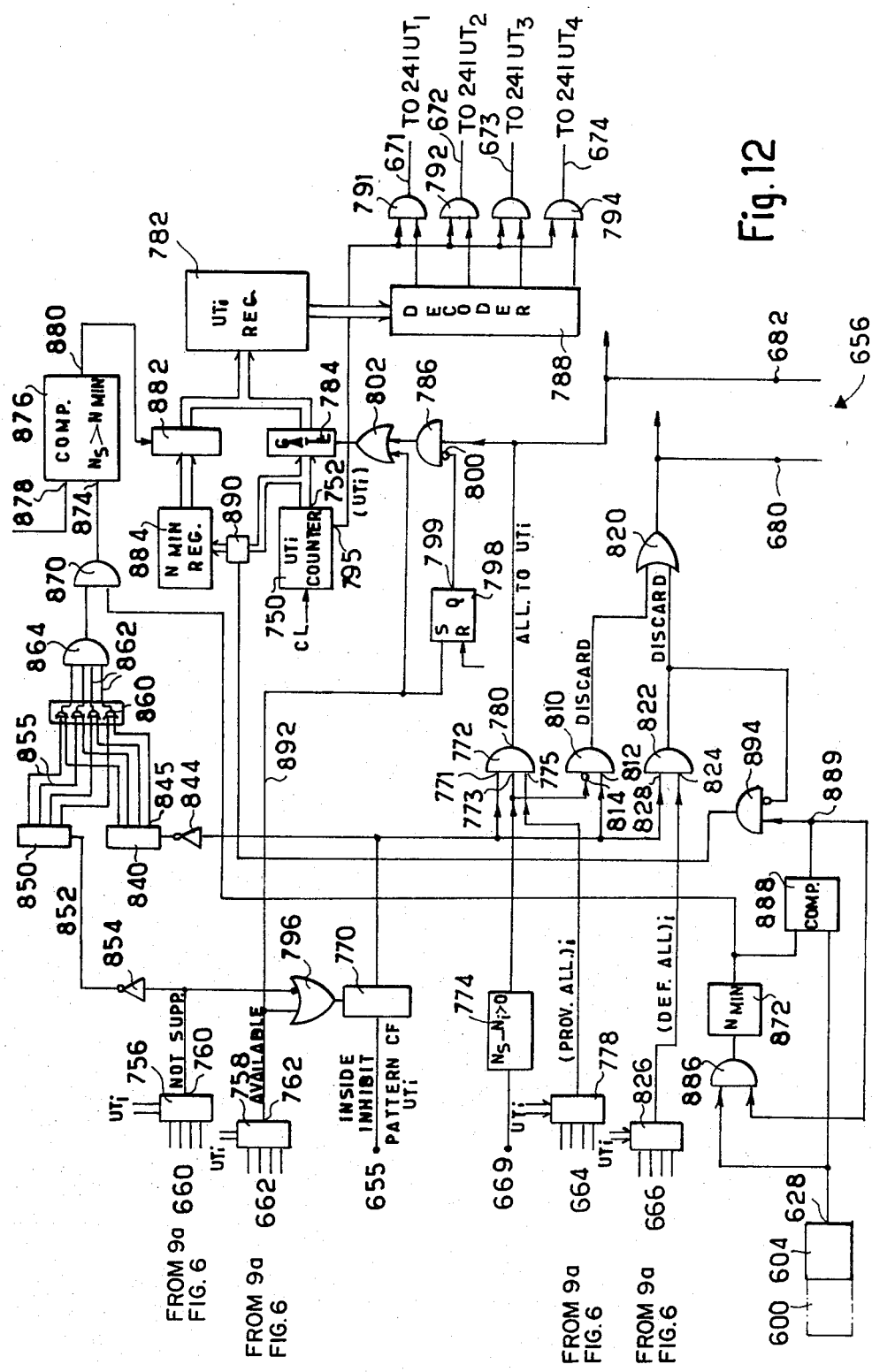

Referring now to FIG. 12 which illustrates decision unit 656, an $UT_i$ counter 750 recycles through four counts, each corresponding to a given processing device $UT_i$ under control of clock signal CL. Its output 752 (signal $UT_i$) is operative to control multiplexers 756 and 758 respectively on "not supplied" lines at input 660 and "available" lines at inputs 662 in order to pass at the respective one line outputs 760 and 762 of these multiplexers only the signal of the input line corresponding to the processing device $UT_i$ designated by the state of counter 750. Controlling inputs of the multiplexers 756 and 758 have been referenced by $UT_i$ indicating thereby that they receive the signal present at output 752 of counter 750.

For the processing device $UT_i$ which is being examined with reference to the newly acquired value $N_s$ and $F_s$, a signal appears at the output of the inhibit pattern check circuit 651 and on input 655, which is directed through a gate 770 to one input 771, of a three-input AND gate 772 which receives on an other input 773 a signal coming out of a comparator 774 which determines whether the difference signal $N_s-N_i$ is positive (output level 1), the third input 775 of AND gate 772 receiving a "provisional allocation" signal for unit $UT_i$ from a multiplexer 778 which receives the four "provisional allocation" lines 664 and is controlled by a control signal $UT_i$ out of counter 750. AND gate 772 delivers a signal at its output 780 if, simultaneously, the newly acquired point is within the inhibit pattern, $N_s$ is greater than $N_i$, and $UT_i$ is in a provisional allocation state. This signal provides an allocation to $UT_i$ (ALL TO $UT_i$) signal on output 682 to reactualize the inhibit pattern for this processing device as indicated with reference to FIG. 10. The allocation to $UT_i$ signal is also operative to load the content of counter 750 into a $UT_i$ register 782 via a gate 784 which is controlled by output 780 through an AND gate 786. The output of $UT_i$ register 782 is connected by a decoder 788 to strobe outputs 671 to 674 of the allocation decision unit 656, via a set of authorization gates 791 to 794 which are enabled when they receive a strobe signal from output 795 of the $UT_i$ counter 750 carrying the overflow signal of such counter when, after having reached a count corresponding to $UT_4$, it returns to the $UT_1$ count.

Thus, after all the processing devices have been reviewed in connection with the newly acquired couple of values $F_s$ and $N_s$, the strobe is sent to the particular processing device whose code has been put into $UT_i$ register 782 at the end of such cycle.

The gate 770 is controlled by the output of an OR gate 796 which has one inverting input connected to the output 760 of multiplexer 756 so as to block gate 770, and thus the operation of AND gate 772, when a "not supplied" signal is present on one of the input lines 660 corresponding to the $UT_i$ processing device under surveying. Thus nothing will happen in the circuit 656 until a new $UT_i$ code is present on the control unit of the multiplexer 756.

The other input of OR gate 796 is connected at the output 762 of the multiplexer 758 so as to block gate 770 and, consequently, any processing at the output of AND gate 772, whenever the line 662 corresponding to the processing device $UT_i$ being surveyed indicates that this device is "available". If such available signal is present at output 762, it sets a bistable circuit 798 whose output 799 is coupled to inverting input 800 of AND gate 786 so as to disable such AND gate for the rest of the surveying cycle. At the same time, output 762 via OR gate 802 enables gate 784 so as to load the content of the $UT_i$ counter 715 to $UT_i$ register 782. In other words, such register will contain the code indication corresponding to the processing device $UT_i$ which is available so as to produce a strobe to that processing device at the end of the surveying cycle of all processing devices if, in the meantime, the circuits have not been reset in response to one of the processing devices surveyed indicating that the newly acquired couple of values $F_s$ and $N_s$ must be discarded.

If the point corresponding to such newly acquired couple is inside the inhibit pattern of a $UT_i$ but its level is smaller than the level $N_i$ already allocated to that $UT_i$, this is detected by AND gate 810 having one input 812 coupled to the output of gate 770 and an inverting input 814 coupled at the output of the comparator 774. The output of AND gate 810 is then operative, via an OR gate 820, to control the generation of a reset signal at output 680 of the circuit 656. Thus, the couple of values $F_s$ and $N_s$ will be discarded.

This will also be the case if, as detected by AND gate 822 the point $N_s$, $F_s$ is within the inhibit pattern of a processing device which is in a definitive allocation state as indicated by the output 824 of a multiplexer 826 having a control input $UT_i$ and receiving the definitive allocation lines 666 on its inputs.

The other input 828 of AND gate 822 is coupled to the output of gate 770. The output of this AND gate 822 is connected via OR gate 820 to the reset output 680.

If the point corresponding to the newly acquired values is outside all the inhibit patterns allocated to the supplied processing devices $UT_i$ surveyed at the end of a cycle under control of counter 750, an attempt is made to allocate the newly acquired couple of values to one of these processing devices if the level of this new couple is greater than the minimum level provisionally allocated to one of these processing devices. An "inhibit pattern" four stage shift register 840 has its input 842 coupled to the output of gate 770 via an inverter 844 and a "supplied" shift register 850 has its input 852 coupled via an inverter 854 to the "not supplied" output 760 of multiplexer 756. The four outputs 845 of register 840 and the four respective outputs 855 of shift register 850 are combined two by two in an OR circuit 860 whose four outputs 862 are coupled to an AND gate 864 which delivers, at the end of a surveying cycle of counter $UT_i$ 750, a signal indicating that the newly acquired point was outside the inhibit pattern of all supplied processing devices $UT_i$, to enable a gate 870 which directs the content of a minimum memory 872 to one input 874 of a comparator 876 receiving on its other input 878 a signal indicative of $N_s$ from register 260 (FIG. 10). If the result of the comparison indicates that $N_s$ is greater than the minimum level value memorized in 872, the output 880 of the comparator 876 enables a gate 882 which allows the transfer of the content of a $N_{min}$ register 884 containing the code of the processing device $UT_i$ corresponding to the $N_{min}$ value in memory 872 to the $UT_i$ register 782. Thus, this register 782 will permit the issue of a strobe pulse to the processing device $UT_i$ to allocate the new set of values $F_s$, $N_s$ to this device, unless this processing device is in a definitive allocation state. This exception is carried out by a circuit containing gates 890 and 894 at the output 889 of a comparator 888 as indicated below.

The memory $N_{min}$ 872 is connected to the stage 604 of the recycling memory 600 via AND gate 886. The output of stage 604 is also connected to a comparator 888 whose second input is coupled at the output of the $N_{min}$ memory 872 so as to compare the value $N_i$ to the value $N_{min}$ in memory 872 and to cause the transfer of the $N_i$ value to the $N_{min}$ by enabling AND gate 886 whenever the result of the comparison indicates at the output 889 of the comparator that $N_i$ is smaller than $N_{min}$. (Initially, when the circuits are reset, the content of the $N_{min}$ memory 872 is set to one). The comparator 889 will cause, in the latter case, the transfer of the content of counter 750 to $N_{min}$ register 884 via a gate 890, i.e. to keep the code of the processing device to which this minimum value is allocated. The gate 890 is enabled via a line 892 at the output of an AND gate 894 which receives, on one input, the indication $N_i$ smaller than $N_{min}$ out of output 889 of comparator 888 and, on another inverting input, a signal out of AND gate 822 so that the gate 890 will not permit the loading of $N_{min}$ register 884, if the respective processing device is in a definitive allocation state.

The arrangement of the command unit thus described provides a means of efficiently allocating the couple of values $N_s$, $F_s$ to the processing devices to minimize idle time thereof, avoiding undue occupation and giving priority to the processing of the stronger signals.

In addition the duration of the pure (unmodulated) carrier may be reduced to a minimum thus minimizing the total duration of each message.

Thus, with a relatively small number of processing devices, a large number of signals reaching the satellite asynchronously may be processed to carry out the data gathering operation of such satellite.

We claim:

1. Apparatus for acquiring and processing a plurality of input signals received asynchronously from a plurality of sources comprising:
   means for acquiring successive values of level from said input signals and for associating with each of said level values a respective frequency value which is an estimate of the frequency of the input signal from which the level value is acquired;
   a plurality of devices each settable in response to an adjustable frequency estimate for processing a signal in said input signals at a frequency in the vicinity of the frequency set; and
   means for allocating said frequency estimate to one of said processing devices to set it in response thereto in dependence upon said frequency estimate and associated level values.

2. Apparatus according to claim 1, wherein said allocating means is operative to prohibit allocation of said frequency estimate to any processing device if said frequency estimate and associated level value satisfy a predetermined relationship with respect to the frequency estimate previously allocated to one of said processing device and associated level value.

3. The apparatus of claim 2, wherein said predetermined relationship is defined by the position of said frequency estimate and associated level value with respect to a frequency and level pattern selected for each processing device operating on a previously allocated frequency estimate, to eliminate frequency estimates of any one of said input signals which is already in the course of being processed by one of said processing devices.

4. The apparatus according to claim 2, wherein said relationship involves a plurality of frequency boundaries determined with respect to the frequency estimate previously allocated to the processing device and associated level boundary values determined with respect to the associated level value.

5. Apparatus according to claim 1, wherein said allocating means is operative to allocate a newly acquired such frequency estimate to one of said processing device which has been previously allocated a frequency estimate associated with a level value lower than that associated with said newly acquired frequency estimate.

6. Apparatus according to claim 5, wherein said allocating means is operative to allocate said newly acquired frequency estimate only if all said processing devices which are supplied are operative on a previously allocated frequency estimate.

7. Apparatus according to claim 6, wherein, further, said allocating means is operative to allocate said newly acquired frequency estimate only if said newly acquired frequency estimate and associated level value is not in a predetermined relationship with respect to any of the previously allocated frequency estimates and associated level values.

8. Apparatus according to claim 1, wherein said allocating means is operative to allocate a newly acquired such frequency estimate to a processing device set to a previously allocated frequency estimate if said newly acquired frequency estimate and its associated level value are in a predetermined relationship with respect to said previously allocated frequency estimate and associated level value.

9. Apparatus according to claim 8, wherein said allocating means is operative to allocate said newly acquired frequency estimate only if it is within a predetermined frequency range with respect to said previously allocated frequency estimate and said newly acquired associated level value is higher than the level value associated with the previously allocated frequency estimate.

10. The apparatus of claim 9, wherein said allocating means further is operative to prohibit said newly acquired frequency estimate within said predetermined frequency range from being allocated to any processing device if its associated level value is below the level value associated with said previously allocated frequency estimate.

11. The apparatus of claim 8, wherein said allocating means further is operative to prohibit said newly acquired frequency estimate from being allocated to any one of said processing devices if said frequency estimate is within a predetermined set of frequency ranges with respect to the previously allocated frequency estimate and its associated level value is within a predetermined set of corresponding level ranges with respect to the level value associated to the previously allocated frequency estimate.

12. The apparatus of claim 1, wherein said allocating means is further operative to prohibit allocation of a newly acquired such frequency estimate to any one of said processing devices in a definitive allocation condition.

13. The apparatus of claim 12, wherein each said processing device includes phase locked loop means operative to provide said allocating means with a definitive allocation condition indication upon locking of said phase lock loop means to one of the input signals in response to a previously allocated frequency estimate.

14. The apparatus of claim 1, wherein said allocating means is operative to allocate a newly acquired such frequency estimate to one of said processing devices in an available condition unless such newly acquired frequency estimate and associated level value are in a predetermined relationship with respect to a previously allocated such frequency estimate and its associated level.

15. The apparatus of claim 1, wherein each of said processing devices includes means for tuning said processing device to the frequency of a said input signal received by said processing device in response to the setting of a frequency estimate.

16. The apparatus of claim 15, wherein said processing device further include means operative to send a definitive allocation indication to said allocating means upon tuning of said processing device to the frequency of the received signal within a predetermined period of time, said allocating means being operative to prohibit allocation of any further frequency estimate to said processing device during processing of the received signal.

17. The apparatus of claim 1, wherein said acquiring means includes filter means responsive to said input signals for producing an output signal having a level related to each signal detected in said input signals.

18. The apparatus of claim 17, wherein said acquiring means further comprises means for combining said input signals with a signal of known variable frequency to produce a combined signal at the input of said filter means whereby the frequency of the combined signal corresponding to the maximum level of the output signal of said filter means is indicative of the detected signal.

19. Apparatus for acquiring and processing a plurality of input signals received asynchronously from a plurality of sources, said signals including respective frequency carriers within a predetermined frequency range, comprising: means for receiving radio signals reaching said station asynchronously to produce representative electrical input signals;

means for producing a sweep signal having a frequency varying across at least a portion of the band width of the frequency range of said input signals;
means for combining said sweep signal with the input signals to produce a combined frequency signal;
means for analysing said combined frequency signal comprising means for filtering said combined signal, means for detecting signal levels at the output of said filtering means, and means for determining the respective frequencies of said combined signal;
a plurality of devices for processing at least one of said input signals in response to respective frequency estimates allocated to said processing devices;
and means for allocating frequency estimates to said processing devices in response to the signal levels at the output of said filter means and the respective frequencies of said combined signal at the input thereof.

20. A method for acquiring and processing a plurality of input signals received asynchronously at a station from a plurality of sources, comprising:

producing values of signal level and respective frequency related to at least one frequency component of said input signals, said respective frequency being an estimate of said frequency component for allocation to one of a plurality of devices for processing one of said input signals at said frequency component;
analysing said frequency and level values with respect to frequency estimates previously allocated to such processing devices and their respective level values and providing an analysis result;
and allocating newly produced frequency and level values to one of said processing devices in response to the result of said analysing step.

21. The method of claim 20, wherein the allocating step of a newly produced couple of values of level and respective frequency estimate comprises at least one of the following courses:

discarding the newly produced frequency estimate and respective level value;
allocating said newly produced frequency estimate to a processing device which had been previously allocated a frequency estimate within a predetermined range from said newly produced frequency estimate, if the associated newly produced level value is greater than the level value associated with the previously allocated frequency estimate, allocating said frequency estimate to a processing device in an available condition;
allocating said newly produced frequency estimate to a processing device which has been previously provisionally allocated a frequency estimate with a respective level lower than the level associated with said newly produced frequency estimate when none of the supplied processing devices is available.

22. The method of claim 20, wherein said newly produced frequency estimate and respective level values are not allocated to any one of the processing devices if they are within a predetermined relationship with respect to a frequency estimate previously allocated to any one of said processing devices and to its respective level.

23. Apparatus for acquiring a plurality of input signals received asynchronously at unknown frequencies within a known input frequency band comprising:

means for analyzing the frequency spectrum of said input frequency band to produce at least one respective frequency estimate indication for each input signal detected therein;
a plurality of processing devices each having means for setting operating frequency thereof in response to such a frequency estimate produced and means operative to progressively tune the operating frequency to that of an input signal having a frequency in the vicinity of the setting frequency estimate; and
means for selectively allocating each frequency estimate produced by said analyzing means to the setting means of one of said processing devices in dependence upon the setting frequency estimate of at least one of said processing devices.

24. The apparatus of claim 23 wherein said allocating means is operative to prevent the allocation of such a frequency estimate to any of the processing devices if such frequency estimate is within prescribed limits from the frequency estimate already allocated to one of the processing devices.

25. The apparatus of claim 23, wherein said frequency analyzing means is operative to produce for each input signal a plurality of successive frequency estimates which draw closer to the true frequency of the signal and said allocating means is operative to successively allocate said successive frequency estimates to the same processing device until the operating frequency thereof is tuned to a respective input signal frequency.

26. Apparatus for acquiring input signals of unknown frequency received asynchronously within a predetermined input frequency band, comprising:

at least one processing device having means for setting operating frequency thereof in response to a frequency estimate and means operative to tune the operating frequency of the device to the frequency of an input signal having a frequency in the vicinity of the frequency estimate;
means for detecting and analyzing the spectrum of input signals in the input frequency band to produce successive frequency estimates for each input signal detected within the input frequency band which estimates each correspond to an associated signal level; and
means for selectively allocating such a frequency estimate to said processing device for setting the operating frequency thereof, as a result of a comparison of the value of such frequency estimate and of the associated signal level respectively with the frequency estimate previously allocated to said processing device and the associated signal level.

27. The apparatus of claim 26, wherein said frequency spectrum detecting and analyzing means comprises means for scanning the input frequency band and coupling input signals through at least one bandpass filter, means for detecting values of the output level of said at least one bandpass filter in response to such scanning and means for producing frequency estimates for each detected output level value as a function of detected signals in respective frequency band portions of said at least one bandpass filter within the input frequency band.

28. Apparatus for acquiring input signals received asynchronously at frequencies unknown within an input frequency band comprising:
 at least one processing device settable in reponse to a frequency estimate for tuning an operating frequency thereof to that of an input signal in the vicinity of the frequency estimate;
 means for scanning the input frequency band and producing respective indications of frequencies scanned within said band;
 means for producing successive signal level indications which pass through a maximum each time said frequency scanning means crosses the frequency of one input signal in the input frequency band;
 each said level indications corresponding to a respective one of said frequency indications which is a frequency estimate of the input signal whose frequency is crossed; and
 means for allowing the operating frequency of said processing device to be set in response to a newly produced frequency estimate if the respective level indication is higher than the level indication associated with the frequency estimate in response to which said processing device was set previously.

29. The apparatus of claim 28 wherein said allowing means is operative only when the processing device has not tuned its operating frequency to that of an input signal.

30. Apparatus for acquiring a plurality of input signals received asynchronously at respective unknown frequencies within a known input frequency band comprising:
 a plurality of signal processing devices each having an operating frequency presettable in response to a frequency estimate to allow the operating frequency to progressively tune itself to the frequency of an input signal in the vicinity of the frequency estimate;
 means for scanning the input frequency band and producing respective frequency indications;
 means for producing successive signals which pass through a maximum level each time said frequency scanning means crosses the frequency of an input signal in the input frequency band; and
 means for selectively allocating to one of the processing devices the frequency indication which corresponds to such maximum level indication as a frequency estimate of the respective input signal, to preset the operating frequency of said processing device, in dependence upon the frequency estimate already allocated to at least one of said processing devices.

* * * * *